(12) United States Patent
Tseng

(10) Patent No.: US 9,342,404 B2
(45) Date of Patent: *May 17, 2016

(54) DECODING METHOD, MEMORY STORAGE DEVICE, AND MEMORY CONTROLLING CIRCUIT UNIT

(71) Applicant: PHISON ELECTRONICS CORP., Miaoli (TW)

(72) Inventor: Chien-Fu Tseng, Yunlin County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 145 days.

This patent is subject to a terminal disclaimer.

(21) Appl. No.: 14/264,040

(22) Filed: Apr. 28, 2014

(65) Prior Publication Data

US 2015/0169401 A1 Jun. 18, 2015

(30) Foreign Application Priority Data

Dec. 12, 2013 (TW) ............................. 102145909 A
Feb. 7, 2014 (TW) ............................. 103104090 A

(51) Int. Cl.
*H04L 1/00* (2006.01)
*G06F 11/10* (2006.01)

(52) U.S. Cl.
CPC ........ *G06F 11/1068* (2013.01); *G06F 11/1048* (2013.01)

(58) Field of Classification Search
CPC ............................ H04L 1/0057; H04L 1/0061
USPC .................. 714/766, 768, 763, 785, 799, 718
See application file for complete search history.

(56) References Cited

U.S. PATENT DOCUMENTS

| | | | |
|---|---|---|---|
| 2008/0089146 A1* | 4/2008 | Fujito | G11C 7/04 365/190 |
| 2012/0072801 A1* | 3/2012 | Takeuchi | G06F 1/3203 714/755 |

* cited by examiner

*Primary Examiner* — Fritz Alphonse
(74) *Attorney, Agent, or Firm* — Jianq Chyun IP Office

(57) ABSTRACT

A decoding method, a memory storage device and a memory controlling circuit unit are provided. First, memory cells are read to obtain verification bits. A first hard bit mode decoding procedure is performed according to the verification bits and whether the first hard bit mode decoding procedure generates a first valid codeword is determined by a first correcting circuit. If the first valid codeword is generated, the first valid codeword is outputted. If the first valid codeword is not generated, a second hard bit mode decoding procedure is performed, and whether the second hard bit mode decoding procedure generates a second valid codeword is determined by a second correcting circuit. A precision of the first correcting circuit is less than a precision of the second correcting circuit. Accordingly, the speed of decoding is increased.

47 Claims, 21 Drawing Sheets

DECODING METHOD, MEMORY STORAGE DEVICE, AND MEMORY CONTROLLING CIRCUIT UNIT

CROSS-REFERENCE TO RELATED APPLICATION

This application claims the priority benefit of Taiwan application serial no. 102145909, filed on Dec. 12, 2013 and Taiwan application serial no. 103104090, filed on Feb. 7, 2014. The entirety of each of the above-mentioned patent applications is hereby incorporated by reference herein and made a part of this specification.

BACKGROUND OF THE INVENTION

1. Field of the Invention

The invention relates to a decoding method, and more particularly, to a decoding method, a memory storage device and a memory controlling circuit unit for a rewritable non-volatile memory module.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Generally, data written in the rewritable non-volatile memory module is encoded according to an error correcting code. The data read from the rewritable non-volatile memory module may be decoded through corresponding decoding procedure. Under some circumstances, a time required for the decoding may be longer if there is an error bit in the read data, and such error bit cannot be corrected. Therefore, how to increase a speed of decoding is one of the major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The invention is directed to a decoding method, a memory storage device and a memory controlling circuit unit, capable of increasing the speed of decoding.

A decoding method is provided according to an exemplary embodiment of the invention, which is used in a rewritable non-volatile memory module. The rewritable non-volatile memory module includes a plurality of first memory cells. The decoding method includes: reading the first memory cells according to a first read voltage to obtain a plurality of first verification bits; performing a first hard bit mode decoding procedure according to the first verification bits, and determining whether the first hard bit mode decoding procedure generates a first valid codeword by a first correcting circuit; if the first valid codeword is generated by the first hard bit mode decoding procedure, outputting the first valid codeword; if the first valid codeword is not generated by the first hard bit mode decoding procedure, performing a second hard bit mode decoding procedure according to the first verification bits, and determining whether the second hard bit mode decoding procedure generates a second valid codeword by a second correcting circuit, and a precision of the first correcting circuit is less than a precision of the second correcting circuit; and if the second valid codeword is generated by the second hard bit mode decoding procedure, outputting the second valid codeword.

A memory storage device is provided according to exemplary embodiments of the invention, which includes a connection interface unit, the rewritable non-volatile memory module described above and a memory controlling circuit unit. The connection interface unit is configured to couple to a host system. The memory controlling circuit unit is coupled to the connection interface unit and the rewritable non-volatile memory module. The memory controlling circuit unit includes a memory management circuit, a first correcting circuit and a second correcting circuit, and a precision of the first correcting circuit is less than a precision of the second correcting circuit. The memory management circuit is configured to read the first memory cells according to a first read voltage to obtain a plurality of first verification bits. The first correcting circuit is configured to perform a first hard bit mode decoding procedure according to the first verification bits, and determine whether the first hard bit mode decoding procedure generates a first valid codeword. If the first valid codeword is generated by the first hard bit mode decoding procedure, the first correcting circuit is configured to output the first valid codeword. If the first valid codeword is not generated by the first hard bit mode decoding procedure, the second correcting circuit is configured to perform a second hard bit mode decoding procedure according to the first verification bits, and determine whether the second hard bit mode decoding procedure generates a second valid codeword. If the second valid codeword is generated by the second hard bit mode decoding procedure, the second correcting circuit is configured to output the second valid codeword.

A memory controlling circuit unit is provided according to an exemplary embodiment of the invention, and configured to control the rewritable non-volatile memory module described above. The memory controlling circuit unit includes a host interface, a memory interface, a memory management circuit and an error checking and correcting circuit. The host interface is configured to couple to a host system. The memory interface is configured to couple to the rewritable non-volatile memory module. The memory management circuit is coupled to the host interface and the memory interface, and configured to read the first memory cells according to a first read voltage to obtain a plurality of first verification bits. The error checking and correcting circuit includes a first correcting circuit and a second correcting circuit, and a precision of the first correcting circuit is less than a precision of the second correcting circuit. The first correcting circuit is configured to perform a first hard bit mode decoding procedure according to the first verification bits, and determine whether the first hard bit mode decoding procedure generates a first valid codeword. If the first valid codeword is generated by the first hard bit mode decoding procedure, the first correcting circuit is configured to output the first valid codeword. If the first valid codeword is not generated by the first hard bit mode decoding procedure, the second correcting circuit is configured to perform a second hard bit mode decoding procedure according to the first verification bits, and determine whether the second hard bit mode decoding procedure generates a second valid codeword. If the second valid codeword is generated by the second hard bit mode decoding procedure, the second correcting circuit is configured to output the second valid codeword.

A decoding method for the rewritable non-volatile memory module is provided according to an exemplary embodiment of the invention. The decoding method comprises: transmitting a first read command sequence, wherein the first read command sequence is configured to read the first memory cells according to a first read voltage to obtain a plurality of first verification bits; executing a parity check procedure according to the first verification bits to obtain a plurality of first syndromes; deciding a second read voltage according to the first syndromes, wherein the second read voltage is different from the first read voltage; transmitting a second read command sequence, wherein the second read command sequence is configured to read the first memory cells according to the second read voltage to obtain a plurality of second verification bits; and executing a first decoding procedure according to the second verification bits.

A memory storage device is provided according to an exemplary embodiment of the invention, where the memory storage device includes a connection interface unit, the rewritable non-volatile memory module, and a memory controlling circuit unit. The memory controlling circuit unit is coupled to the connection interface unit and the rewritable non-volatile memory module, and is configured to determine if a soft bit mode decoding procedure is supported according to a identification code of the rewritable non-volatile memory module. If determining the soft bit mode decoding procedure is supported, the memory controlling circuit unit is configured to obtain a predetermined lookup table, and execute the soft bit mode decoding procedure according to the predetermined lookup table. If the soft bit mode decoding procedure is not supported, the memory controlling circuit unit is configured to establish a lookup table, and execute the soft bit mode decoding procedure according to the lookup table.

According to an exemplary embodiment of the invention, a memory storage device comprising a connection interface unit, a rewritable non-volatile memory module having a plurality of first memory cell, and a memory controlling circuit unit is provided. The memory controlling circuit unit is coupled to the connection interface unit and the rewritable non-volatile memory module, wherein the memory controlling circuit unit is configured to issue a first read command sequence indicating to read the first memory cells according to a first read voltage to obtain a plurality of first verification bits. The memory controlling circuit unit is further configured to perform a parity check procedure according to the first verification bits to obtain a plurality of first syndromes and determine a second read voltage according to the first syndromes, wherein the second read voltage is different from the first read voltage. The memory controlling circuit unit is further configured to issue a second read command sequence indicating to read the first memory cells according to the second read voltage to obtain a plurality of second verification bits. The memory controlling circuit unit is further configured to perform a first decoding procedure according to the second verification bits.

According to an exemplary embodiment of the invention, in the operation of determining the second read voltage according to the first syndromes, the memory controlling circuit unit calculates a check sum according to the first syndromes, updates check sum information according to the syndrome sum, and determines whether the check sum information matches a balance condition. And, the memory controlling circuit unit increases or decreases the first read voltage to obtain the second read voltage based on a result of the determining whether the check sum information matches the balance condition.

According to an exemplary embodiment of the invention, the check sum information is a check sum vector, and in the operation of updating the check sum information according to the syndrome sum, the memory controlling circuit unit adds the check sum into the check sum vector. And, in the operation of determining whether the check sum information matches the balance condition, the memory controlling circuit unit obtains a differential vector of the check sum vector, calculates a sum of the differential vector, and determining whether the sum of the differential vector is smaller than a balance threshold value.

According to an exemplary embodiment of the invention, a memory controlling circuit unit for controlling a rewritable non-volatile memory module including a plurality of first memory cells is provided. The memory controlling circuit unit comprises a host interface, a memory interface, a memory management circuit, and an error checking and correcting circuit. The host interface is configured to couple to a host system. The memory interface is configured to couple to the rewritable non-volatile memory module. The memory management circuit is coupled to the host interface and the memory interface, wherein the memory management circuit is configured to issue a first read command sequence indicating to read the first memory cells according to a first read voltage to obtain a plurality of first verification bits. The error checking and correcting circuit is configured to perform a parity check procedure according to the first verification bits to obtain a plurality of first syndromes. The memory management circuit is further configured to determine a second read voltage according to the first syndromes, wherein the second read voltage is different from the first read voltage. The memory management circuit is further configured to issue a second read command sequence indicating to read the first memory cells according to the second read voltage to obtain a plurality of second verification bits. The error checking and correcting circuit is further configured to perform a first decoding procedure according to the second verification bits.

According to an exemplary embodiment of the invention, in the operation of determining the second read voltage according to the first syndromes, the memory management circuit calculates a check sum according to the first syndromes, updates check sum information according to the syndrome sum, and determines whether the check sum information matches a balance condition. And, the memory management circuit increases or decreases the first read voltage to obtain the second read voltage based on a result of the determining whether the check sum information matches the balance condition.

According to an exemplary embodiment of the invention, the check sum information is a check sum vector, and in the operation of updating the check sum information according to the syndrome sum, the memory management circuit adds the check sum into the check sum vector. And, in the operation of determining whether the check sum information matches the balance condition, the memory management circuit obtains a differential vector of the check sum vector, calculates a sum of the differential vector, and determining whether the sum of the differential vector is smaller than a balance threshold value.

Based on above, in the decoding method, the memory storage device, the memory controlling circuit unit proposed according to the exemplary embodiments of the invention, two correcting circuits with different precisions are configured, so that the speed of decoding may be increased.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
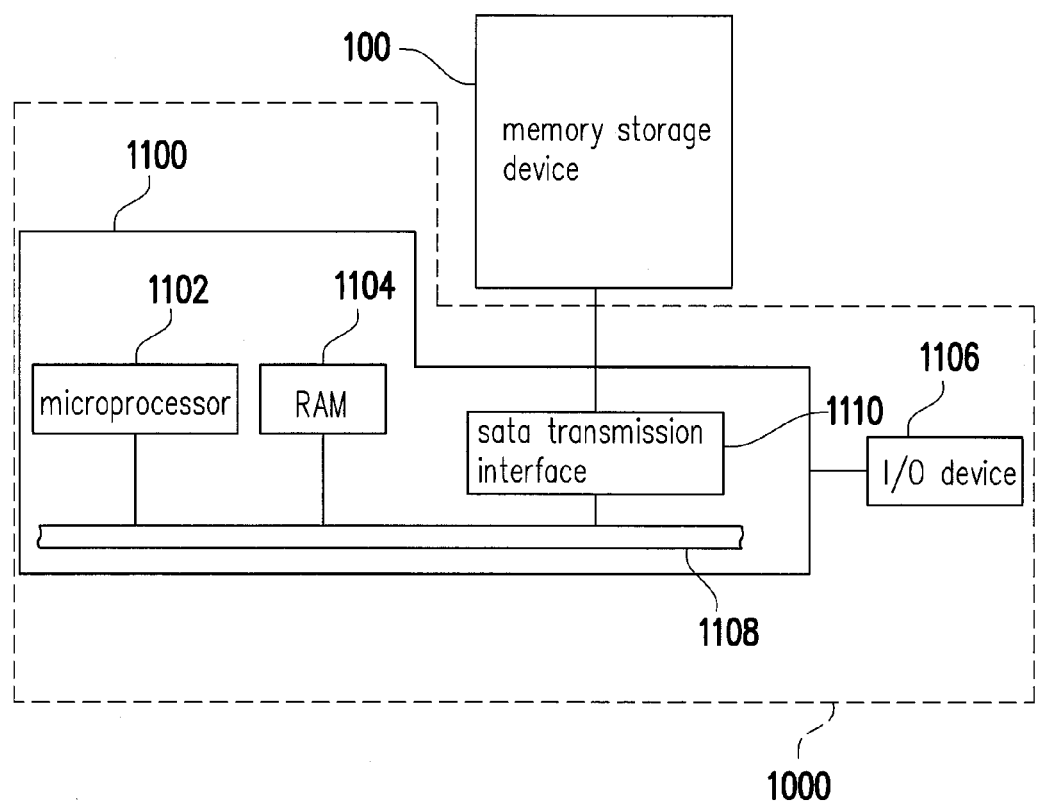
FIG. 1 illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 2:
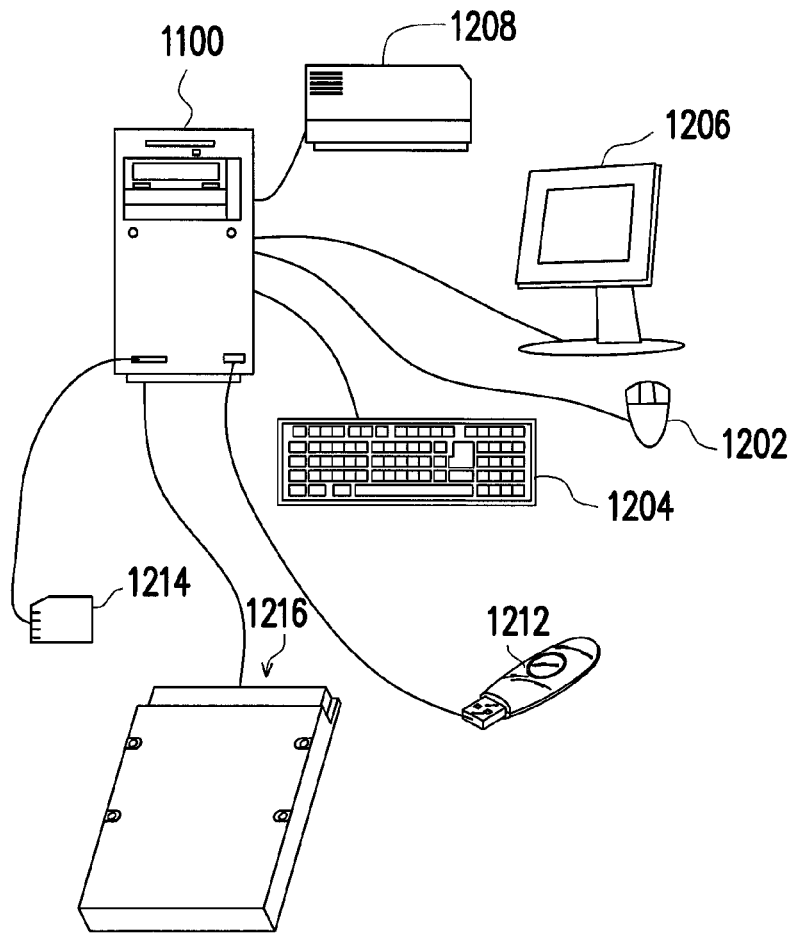
FIG. 2 is a schematic diagram illustrating a computer, an input/output device and a memory storage device according to an exemplary embodiment.

FIG. 1 illustrates a host system and a memory storage device according to an exemplary embodiment. FIG. 2 is a schematic diagram illustrating a computer, an input/output device and a memory storage device according to an exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the embodiment of the invention, the memory storage device 100 is coupled to other devices of the host system 1000 through the data transmission interface 1110. By using the microprocessor 1102, the random access memory (RAM) 1104 and the Input/Output (I/O) device 1106, data may be written into the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 2.

Figure 3:
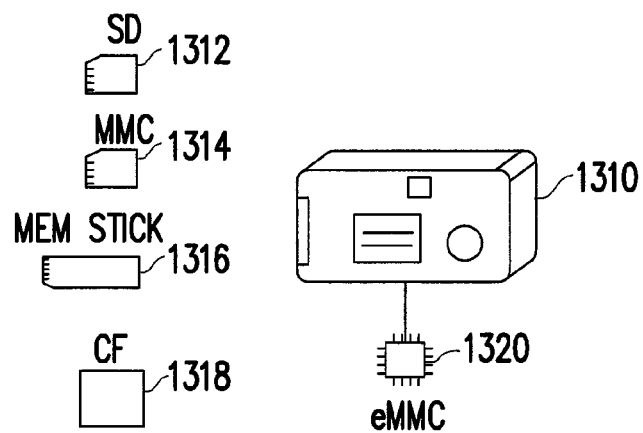
FIG. 3 is a schematic diagram of a host system and a memory storage device according to an exemplary embodiment.

FIG. 3 is a schematic diagram of a host system and a memory storage device according to an exemplary embodiment.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
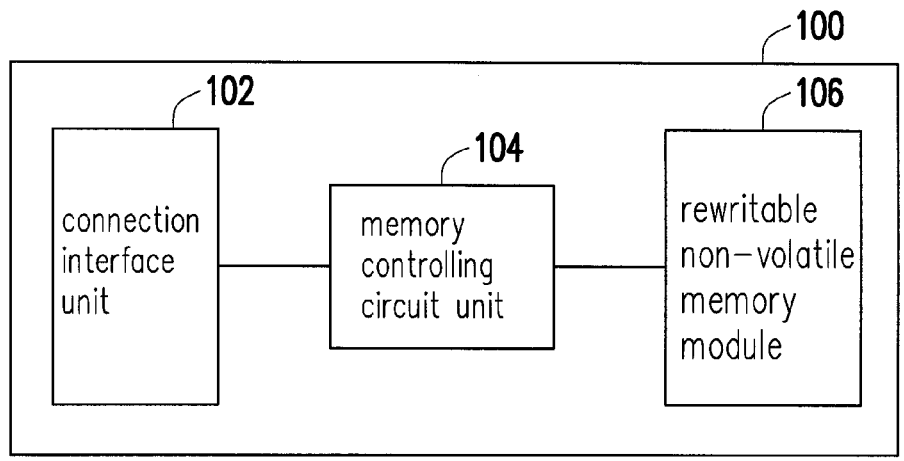
FIG. 4 is a schematic block diagram of the memory storage device depicted in FIG. 1.

FIG. 4 is a schematic block diagram of the memory storage device depicted in FIG. 1.

Referring to FIG. 4, the memory storage device 100 includes a connection interface unit 102, a memory controlling circuit unit 104 and a rewritable non-volatile memory storage module 106.

In the present exemplary embodiment, the connection interface unit 102 is compatible with a serial advanced technology attachment (SATA) standard. However, the invention is not limited thereto, and the connection interface unit 102 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 102 and the memory controlling circuit unit 104 may be packaged into one chip, or the connection interface unit 102 is distributed outside of a chip containing the memory controlling circuit unit 104.

The memory controlling circuit unit 104 is configured to execute a plurality of logic gates or control commands which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory controlling circuit unit 104 and configured to store data written from the host system 1000. The rewritable non-volatile memory module 106 may be a Single Level Cell (SLC) NAND flash memory module, a Multi Level Cell (MLC) NAND flash memory module (i.e., a flash memory module capable of storing two bits of data in one memory cell), a Triple Level Cell (TLC) NAND flash memory module (i.e., a flash memory module capable of storing three bits of data in one memory cell), other flash memory modules or any memory module having the same features.

Figure 5:
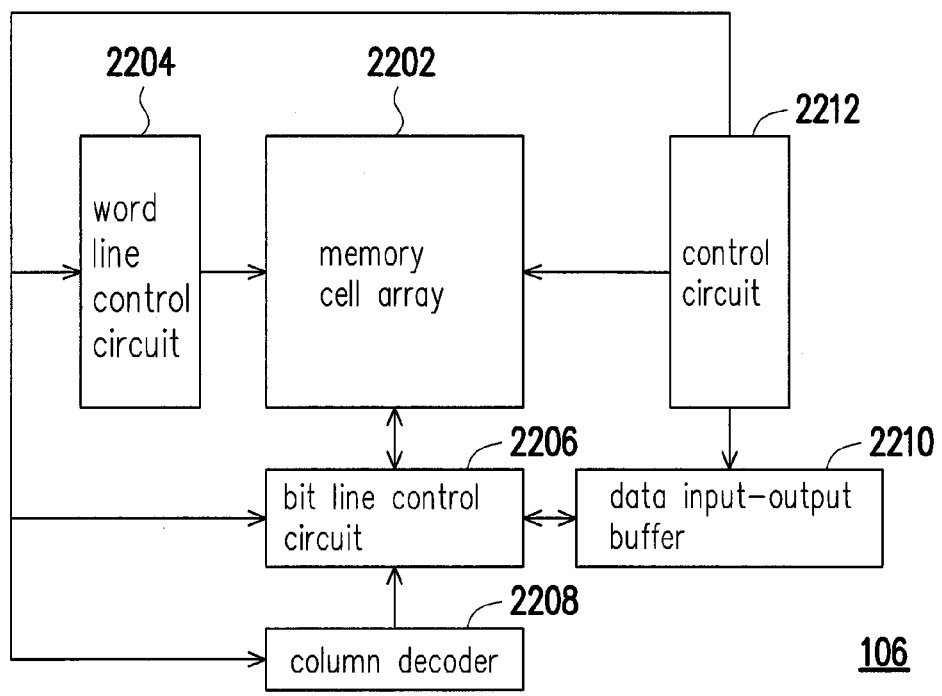
FIG. 5 is a schematic block diagram illustrating a rewritable non-volatile memory module according to an exemplary embodiment.
Figure 6:
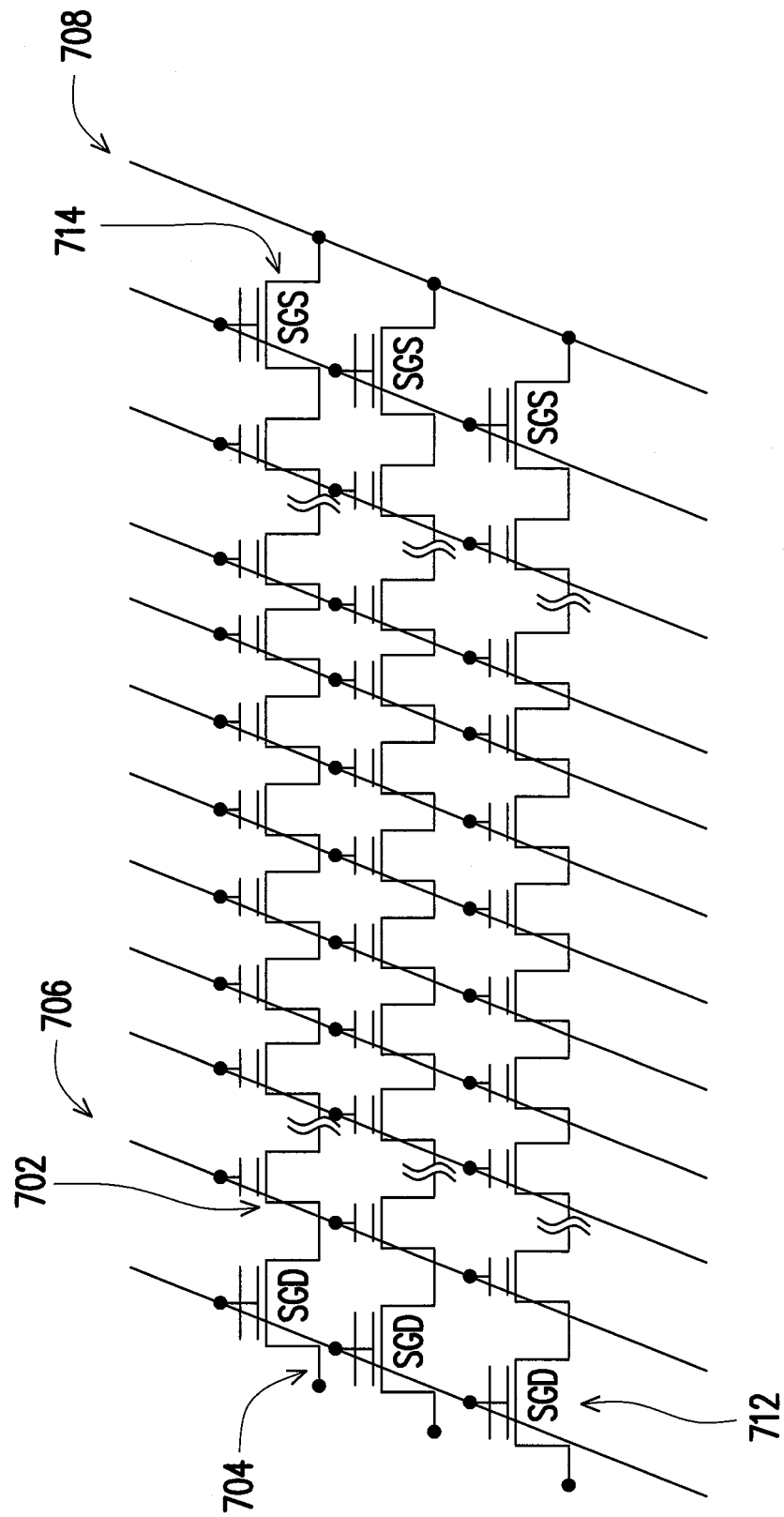
FIG. 6 is a schematic diagram illustrating a memory cell array according to an exemplary embodiment.

FIG. 5 is a schematic block diagram illustrating a rewritable non-volatile memory module according to an exemplary embodiment. FIG. 6 is a schematic diagram illustrating a memory cell array according to an exemplary embodiment.

Referring to FIG. 5, the rewritable non-volatile memory module 106 includes a memory cell array 2202, a word line control circuit 2204, a bit line control circuit 2206, a column decoder 2208, a data input-output buffer 2210 and a control circuit 2212.

In the present exemplary embodiment, the memory cell array 2202 may include a plurality of memory cells 702 used to store data, a plurality of select gate drain (SGD) transistors 712, a plurality of select gate source (SGS) transistors 714, as well as a plurality of bit lines 704, a plurality of word lines 706, a common source line 708 connected to the memory cells (as shown in FIG. 6). The memory cell 702 is disposed at intersections of the bit lines 704 and the word lines 706 in a matrix manner (or in a 3D stacking manner). In case a writing command or a reading command is received from the memory controlling circuit unit 104, the control circuit 2212 controls the word line control circuit 2204, the bit line control circuit 2206, the column decoder 2208, the data input-output buffer 2210 to write the data in the memory cell array 2202 or read the data from the memory cell array 2202. Therein, the word line control circuit 2204 is configured to control voltages applied to the word lines 706; the bit line control circuit 2206 is configured to control voltages applied to the bit lines 704; the column decoder 2208 is configured to select the corresponding bit line according to a row address in a command; and the data input-output buffer 2210 is configured to temporarily store the data.

The memory cell in the rewritable non-volatile memory module 106 may store multiple bits by changing a threshold voltage of one memory cell. More specifically, in each of the memory cells, a charge trapping layer is provided between a control gate and a channel. Amount of electrons in the charge trapping layer may be changed by applying a write voltage to the control gate thereby changing the threshold voltage of the memory cell. This procedure of changing the threshold voltage is also referred to as "writing data into the memory cell" or "programming the memory cell". Each of the memory cells in the memory cell array 2022 has a plurality of storage statuses depended on changes in the threshold voltage. Moreover, which of the storage statuses is the memory cell belong to may be determined through read voltages, so as to obtain the bits stored in the memory cell.

Figure 7:
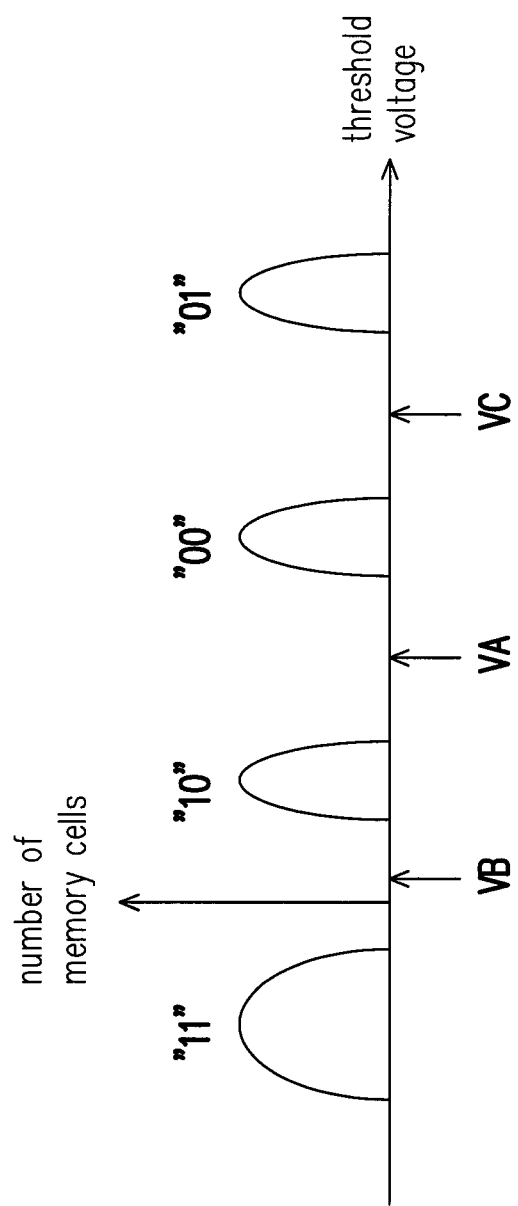
FIG. 7 is a histogram of a gate voltage corresponding to write data stored in the memory cell array according to an exemplary embodiment.

FIG. 7 is a histogram of a gate voltage corresponding to write data stored in the memory cell array according to an exemplary embodiment.

Referring to FIG. 7 that takes the MLC NAND flash memory for example, in which each of the memory cells has four storage statuses depended on different threshold voltages, and the statuses represent bits "11", "10", "00" and "01", respectively. In other words, each of the statuses includes a least significant bit (LSB) and a most significant bit (MSB). In the present exemplary embodiment, a first bit counted from the left in the statuses (i.e., "11", "10", "00" and "01") is the LSB, and a second bit counted from the left is the MSB. Accordingly, in this exemplary embodiment, each of the memory cells may store two bits. It should be understood that, the storage statuses corresponding to the threshold voltage as illustrated in the FIG. 7 are merely an example. In another exemplary embodiment of the invention, the storage statuses corresponding to the threshold voltage may also have an arrangement of "11", "10", "01" and "00" that is arranged according to the threshold voltage from small to large, or other arrangements. In addition, in another exemplary embodiment, it can also be defined that the first bit counted from the left is the MSB, and the second bit counted from the left is the LSB.

Figure 8:
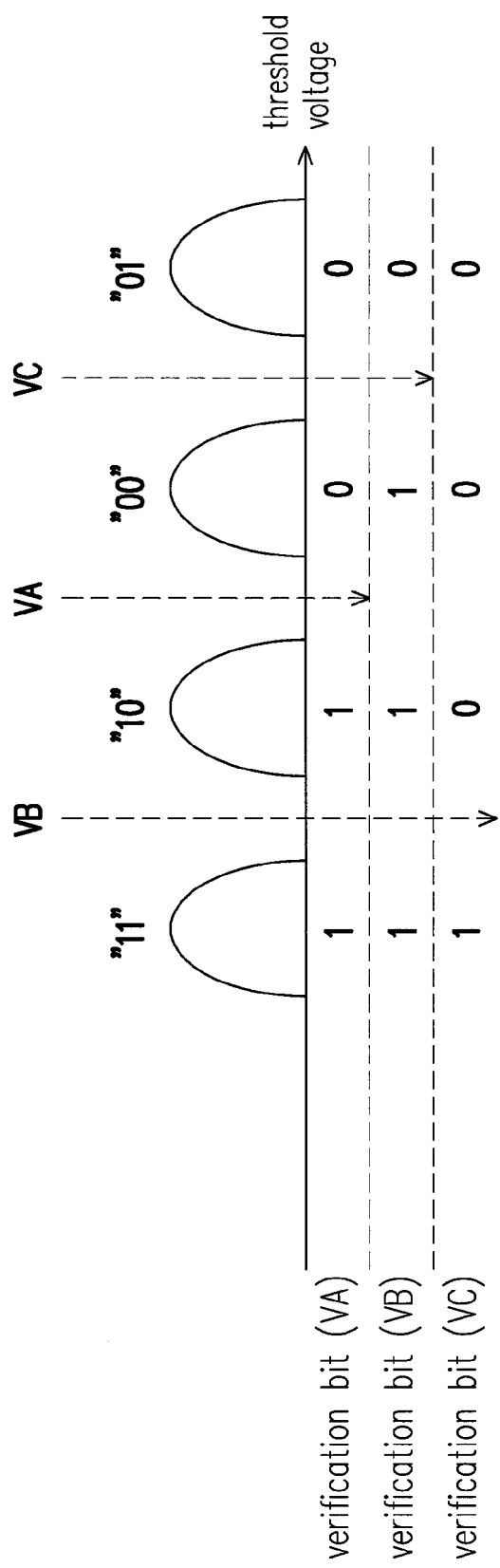
FIG. 8 illustrates a schematic diagram of reading data from a memory cell according to an exemplary embodiment.

FIG. 8 illustrates a schematic diagram of reading data from a memory cell according to an exemplary embodiment, which uses a MLC NAND flash memory for example.

Referring to FIG. 8, in a reading operation for the memory cells of the memory cell array 2202, the read voltage is applied to the control gate, and data stored in the memory cells are identified according whether the channel of the memory cell is turned on. A verification bit (VA) is configured to indicate whether the channel of the memory cell is turned on when a read voltage VA is applied; a verification bit (VC) is configured to indicate whether the channel of the memory cell is turned on when a read voltage VC is applied; and a verification bit (VB) is configured to indicate whether the channel of the memory cell is turned on when a read voltage VB is applied. It is assumed that the corresponding channel of the memory cell being turned on is indicated by the verification bit being "1", and the corresponding channel of the memory cell not being turned on is indicated by the verification bit being "0". As shown in FIG. 8, which of the storage statuses the memory cell is in may be determined according to the verification bits (VA) to (VC), thereby obtaining the bits being stored.

Figure 9:
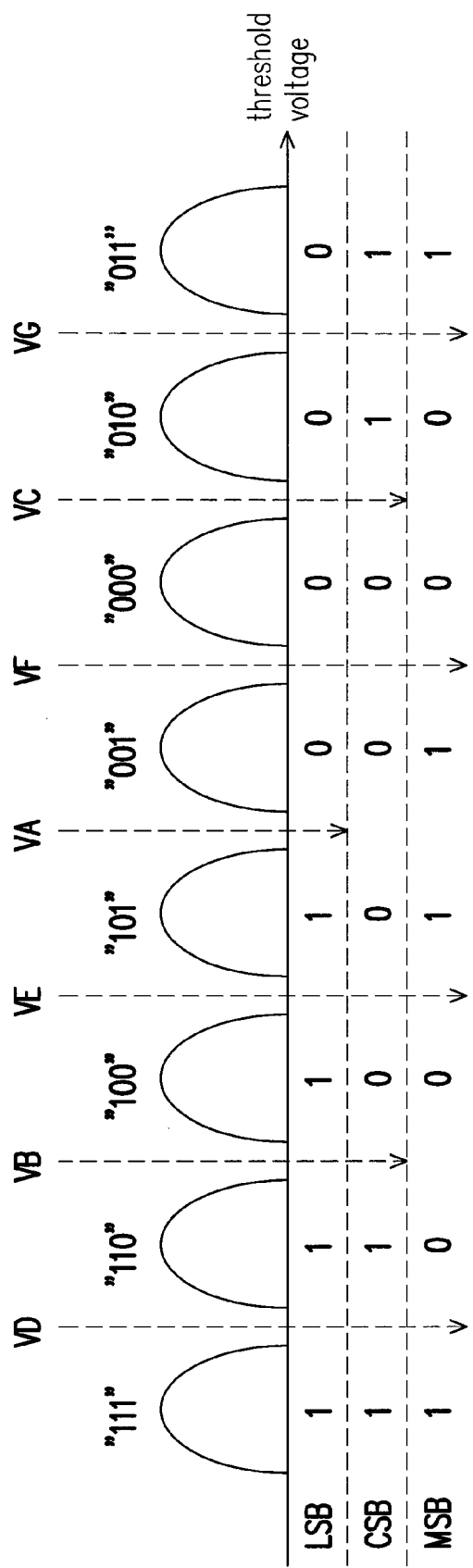
FIG. 9 illustrates a schematic diagram of reading data from a memory cell array according to another exemplary embodiment.

FIG. 9 illustrates a schematic diagram of reading data from a memory cell array according to another exemplary embodiment.

Referring to FIG. 9 which takes a TLC NAND flash memory for example, each of the storage statues includes a first bit counted from the left being the least significant bit (LSB), a second bit counted from the left being a center significant bit (CSB) and a third bit counted from the left being the most significant bit (MSB). In this embodiment, the memory cell includes eight storage statuses depended on different threshold voltages (i.e., "111", "110", "100", "101", "001", "000", "010" and "011"). The bits stored in the memory cell may be identified by applying the read voltages VA to VC to the control gate. Therein, it should be noted that, an arranging sequence of the eight storage statuses may be decided based on designs of manufacturers without being limited by the arranging sequence of this embodiment.

Figure 10:
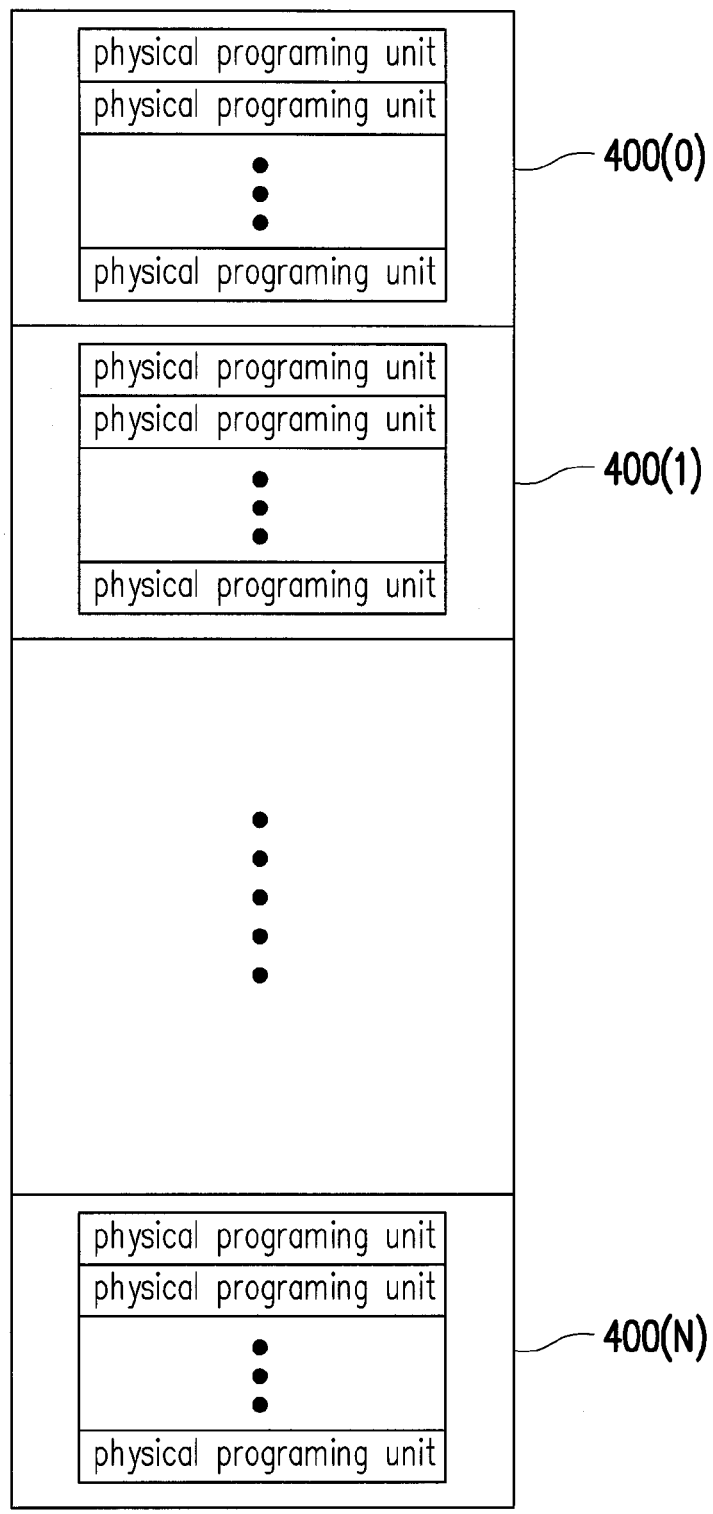
FIG. 10 is a schematic diagram illustrating a management of the rewritable non-volatile memory module according to an exemplary embodiment.

FIG. 10 is a schematic diagram illustrating a management of the rewritable non-volatile memory module according to an exemplary embodiment.

Referring to FIG. 10, the memory cells 702 of the rewritable non-volatile memory module 106 constitute a plurality of physical programming units, and the physical programming units constitutes a plurality of physical erasing units 400(0) to 400(N). More specifically, the memory cells on the same word line are grouped into one or more physical programming units. In case each of the memory cells can store more than two bits, the physical programming units on the same word line can be classified into a lower physical programming unit and an upper physical programming unit. For instance, the LSB of each memory cell is the lower physical programming unit, and the MSB of each memory cell is the upper physical programming unit. Generally, in the MLC NAND flash memory, a writing speed of the lower physical programming unit is faster than a writing speed of the upper physical programming unit, or a reliability message of the lower physical programming unit is higher than a reliability message of the upper physical programming unit. In the present exemplary embodiment, the physical programming unit is a minimum unit for programming. That is, the physical programming unit is the minimum unit for writing data. For example, the physical programming unit is a physical page or a physical sector. In case the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, each of the data bit areas contains 32 physical sectors, and a size of each physical sector is 512-byte (B). However, in other exemplary embodiments, the data bit area may also include 8, 16, or more or less of the physical sectors, and amount and sizes of the physical sectors are not limited in the invention. On the other hand, the physical erase unit is the minimal unit for erasing. Namely, each physical erasing unit contains the least number of memory cells to be erased together. For instance, the physical erasing unit is a physical block.

Figure 11:
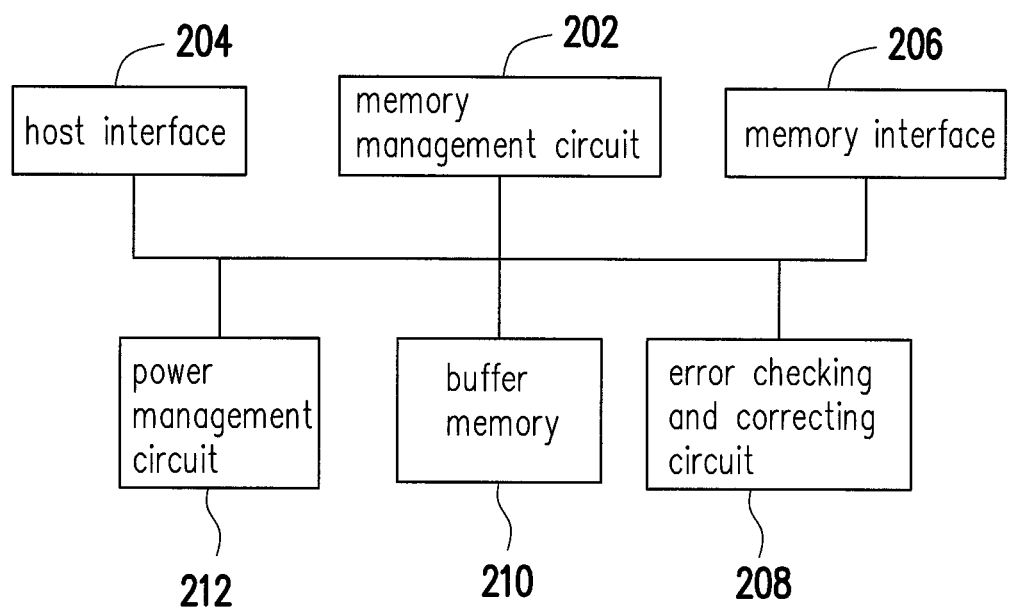
FIG. 11 is a schematic block diagram illustrating a memory controlling circuit unit according to an exemplary embodiment.

FIG. 11 is a schematic block diagram illustrating a memory controlling circuit unit according to an exemplary embodiment. It should be understood that, the structure of the memory controlling circuit unit depicted in FIG. 11 is only an example, and the invention is not limited thereto.

Referring to FIG. 11, the memory controlling circuit unit 104 includes a memory management circuit 202, a host interface 204, a memory interface 206 and an error checking and correcting circuit 208.

The memory management circuit 202 is configured to control overall operations of the memory controlling circuit unit 104. Specifically, the memory management circuit 202 has a plurality of control commands. When the memory storage device 100 operates, the control commands are executed to perform various operations such as data writing, data reading and data erasing. Operations of the memory management circuit 202 are similar to the operations of the memory controlling circuit unit 104, thus related description is omitted hereinafter.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. When the memory storage device 100 operates, the control commands are executed by the microprocessor to perform operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). Particularly, the ROM has an activate code, which is executed by the microprocessor unit to load the control commands stored in the rewritable non-volatile memory module 106 to the RAM of the memory management circuit 202 when the memory controlling circuit unit 104 is enabled. Next, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured for managing the physical blocks of the rewritable non-volatile memory module 106; the memory writing circuit is configured for issuing a writing command to the rewritable non-volatile memory module 106 in order to write data into the rewritable non-volatile memory module; the memory reading circuit is configured for issuing a reading command to the rewritable non-volatile memory module 106 in order to read data from the rewritable non-volatile memory module 106; the memory erasing circuit is configured for issuing an erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

The error checking and correcting circuit 208 is coupled to the memory management circuit 202 and configured to perform an error checking and correcting process to ensure the correctness of data. Specifically, when the memory management circuit 202 receives the writing command from the host system 1000, the error checking and correcting circuit 208 generates an error correcting code (ECC) or an error detecting code (EDC) for data corresponding to the writing command, and the memory management circuit 202 writes data and the ECC or the EDC corresponding to the writing command to the rewritable non-volatile memory module 106. Subsequently, when the memory management circuit 202 reads the data from the rewritable non-volatile memory module 106, the corresponding ECC or the EDC is also read from the rewritable non-volatile memory module 106, and the error checking and correcting circuit 208 executes the error checking and correcting procedure for the read data based on the ECC or the EDC. In the present exemplary embodiment, a low density parity code (LDPC) is used by the error checking and correcting circuit 208.

In the low density parity code, a valid codeword is defined by a parity check matrix. The parity check matrix is marked as a matrix H and a codeword is marked as CW hereinafter. According to an equation (1) below, in case a result calculated by multiplying the parity check matrix H by the codeword CW is a zero vector, it indicates that the codeword CW is the valid codeword. Therein, an operator ⊗ represents a mod 2 matrix multiplication. In other words, a null space of the matrix H includes all the valid codewords. However, a content of the codeword CW is not particularly limited in the invention. For instance, the codeword CW may also include the error correcting code or the error detecting code generated by using any algorithm.

$$H \otimes CW^T = 0 \tag{1}$$

Therein, a dimension of the matrix H is k-by-n, and a dimension of the codeword CW is 1-by-n. Therein, k and n are positive integers. The codeword CW includes message bits and parity bits. Namely, the codeword CW may be represented by [M P], in which a vector M is constituted by the message bits, and a vector P is constituted by the parity bits. A dimension of the vector M is 1-by-(n−k), and a dimension of the vector P is 1-by-k. Hereinafter, the message bits and the parity bits are collectively referred to as data bits. In other words, the codeword CW includes n bits, in which a length of the message bits is (n−k) bits, and a length of the parity bits is k bits. Namely, a code rate of the codeword CW is (n−k)/n.

Generally, a generation matrix (marked as G hereinafter) is used during decoding, so that an equation (2) below may be satisfied by arbitrary values of the vector M. Therein, a dimension of the generation matrix G is (n−k)-by-n.

$$M \otimes G = [MP] = CW \tag{2}$$

Therein, the codeword CW generated by the equation (2) is the valid codeword. Therefore, when the equation (2) is substituted into the equation (1), an equation (3) below may be obtained accordingly.

$$H \otimes G^T \otimes M^T = 0 \tag{3}$$

Since the vector M may be arbitrary values, an equation (4) below may definitely be satisfied. In other words, after the parity check matrix H is decided, the corresponding generation matrix G may also be decided.

$$H \otimes G^T = 0 \tag{4}$$

When decoding the codeword CW, a parity check procedure is first performed on the data bits in the codeword. For instance, the parity check matrix H may be multiplied by the codeword CW to generate a vector (hereinafter, marked as S, as shown in an equation (5) below). If the vector S is the zero vector, the codeword CW may be directly outputted. If the vector S is not the zero vector, it indicates that the codeword CW is not the valid codeword.

$$H \otimes CW^T = S \tag{5}$$

A dimension of the vector S is k-by-1, in which each element is referred to as a syndrome. If the codeword CW is not the valid codeword, the error checking and correcting circuit 208 may perform a decoding procedure attempting to correct an error bit in the codeword CW.

Figure 12:
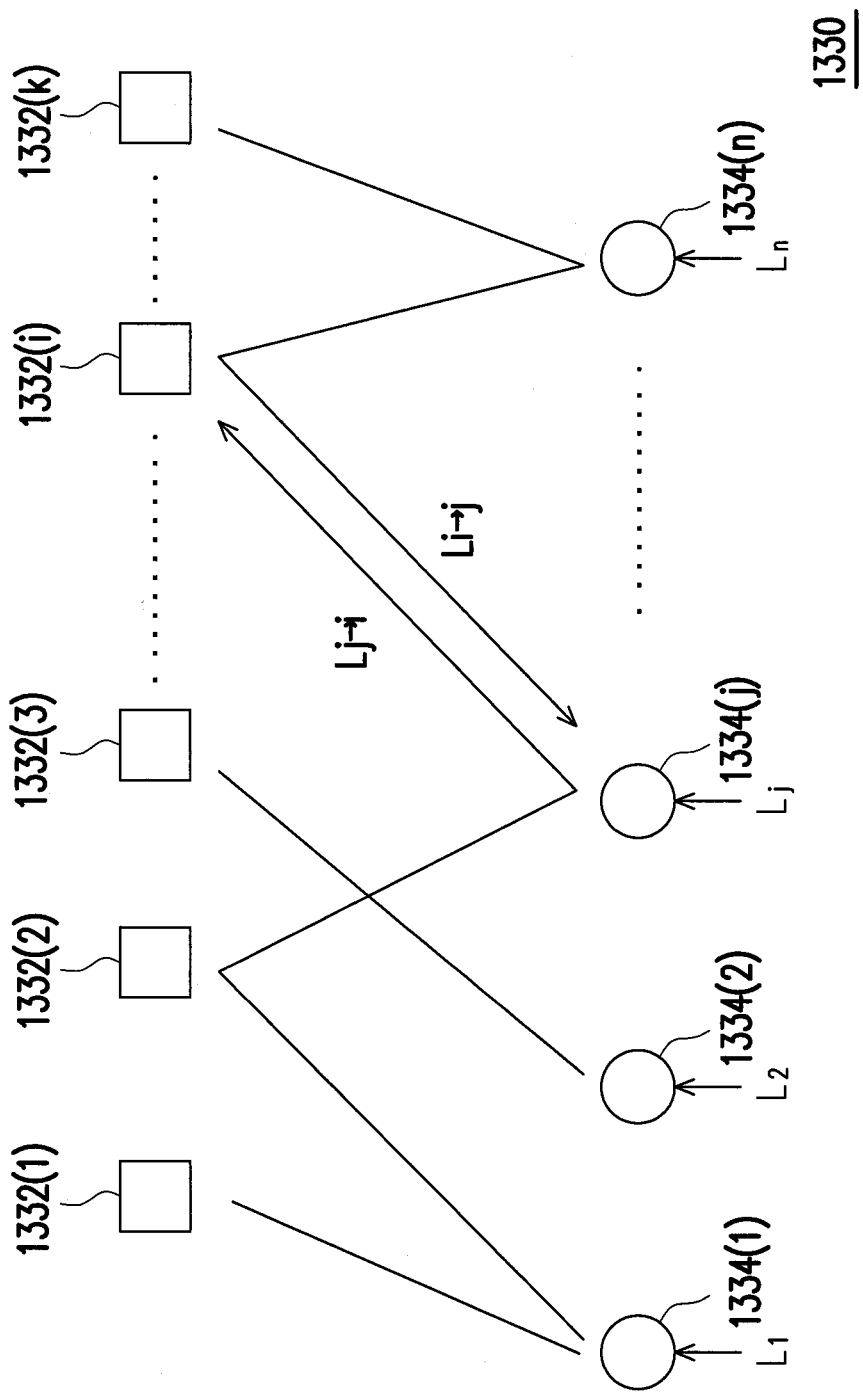
FIG. 12 is a schematic diagram illustrating a parity check matrix according to an exemplary embodiment.

FIG. 12 is a schematic diagram illustrating a parity check matrix according to an exemplary embodiment.

Referring to FIG. 12, generally, the parity check matrix H may be represented by a graph 1330 which includes parity nodes 1332(1) to 1332(k) and message nodes 1334(1) to 1334(n). Each of the parity nodes 1332(1) to 1332(k) is corresponding to one syndrome, and each of the message nodes 1334(1) to 1334(n) is corresponding to one data bit. Corresponding relations between the data bits and the syndromes (i.e., connecting relation between the message nodes 1334(1) to 1334(n) and the parity nodes 1332(1) to 1332(k)) is generated according to the parity check matrix. More specifically, in case an element at a $i^{th}$ row and a $j^{th}$ column is 1, a $i^{th}$ parity node 1332(i) is connected to a $j^{th}$ message node 1334(j), and i and j are positive integers.

When the memory management circuit 202 reads a n number of data bits (which forms one codeword) from the rewritable non-volatile memory module 106, the memory management circuit 202 may also obtain a channel reliability message of each of the data bits. These channel reliability messages are used to represent probabilities (or referred to as a reliance level) of one specific data bit to be decoded into "1" or "0", detailed description thereof will be provided below. In the graph 1330, the message nodes 1334(1) to 1334(n) may also receive the corresponding channel reliability messages. For instance, the message node 1332(1) may receive a channel reliability message $L_1$ of a first data bit, and the message node 1332(j) may receive a channel reliability message $L_j$ of a $j^{th}$ data bit.

The error checking and correcting circuit 208 may perform the decoding procedure according to a structure of the graph and the channel reliability messages $L_1$ to $L_n$. The decoding procedure may include an iterative decoding. Specifically, in the iterative decoding, the message nodes 1334(1) to 1334(n) may calculate and provide the reliability messages to the parity nodes 1332(1) to 1332(m), and the parity nodes 1332(1) to 1332(m) may also calculate and provide the reliability messages to the message nodes 1334(1) to 1334(n). The reliability messages are transmitted along edges in the graph 1330. For instance, the reliability message $L_{i \to j}$ is one transmitted from the parity node 1332(i) to the message node 1334(j), and the reliability message $L_{j \to i}$ is one transmitted from the message node 1334(j) to the parity node 1332(i). These reliability messages are used to represent probabilities (or, the reliance level) of one specific data bit to be decoded into "1" or "0", which are considered by one node. For instance, the reliability message $L_{j \to i}$ represents the reliance level (which may be positive or negative) for the $j^{th}$ data bit being decoded into "1" or "0" which is considered by the message node 1334(j), the reliability message $L_{i \to j}$ represents the reliance level for the $j^{th}$ data bit being decoded into "1" or "0" which is considered by the message node 1332(i). The message nodes 1334(1) to 1334(n) and the parity nodes 1332(1) to 1332(m) may calculate reliability messages to be outputted according to the reliability message being inputted, which is similar to that in calculating the conditional probabilities of one specific data bit to be decoded into "1" or "0". Therefore, above-mentioned process of transmitting the reliability messages may also be referred to as a belief propagation.

Based on different algorithms being adopted, different reliability messages may be calculated by the message nodes 1334(1) or 1334(n) and/or the parity nodes 1332(1) to 1332(m). For instance, the error checking and correcting circuit 208 may adopt a Sum-Product Algorithm, a Min-Sum Algorithm, or a bit-flipping Algorithm, but the algorithm being adopted is not particularly limited in the invention.

In each iteration of the iterative decoding, the message nodes 1334(1) to 1334(n) may transmit the reliability messages to the parity nodes 1332(1) to 1332(m), and the parity nodes 1332(1) to 1332(m) may transmit the reliability messages to the message nodes 1334(1) to 1334(n). After each of the iteration, the message nodes 1334(1) to 1334(n) may calculate the probabilities of each data bit to be decoded into "1" or "0" according to the current reliability message. Subsequently, the parity check procedure is performed on the calculated data bit. Namely, the codeword generated by the data bit is multiplied by the parity check matrix, so as to determine whether such codeword is the valid codeword. If the generated codeword is the valid codeword, the iterative decoding is stopped. If the generated codeword is not the valid codeword, the next iteration is performed. When the number of iterations in the iterative decoding exceeds a preset value, the iterative decoding is also stopped, indicating that decoding fails.

Figure 13:
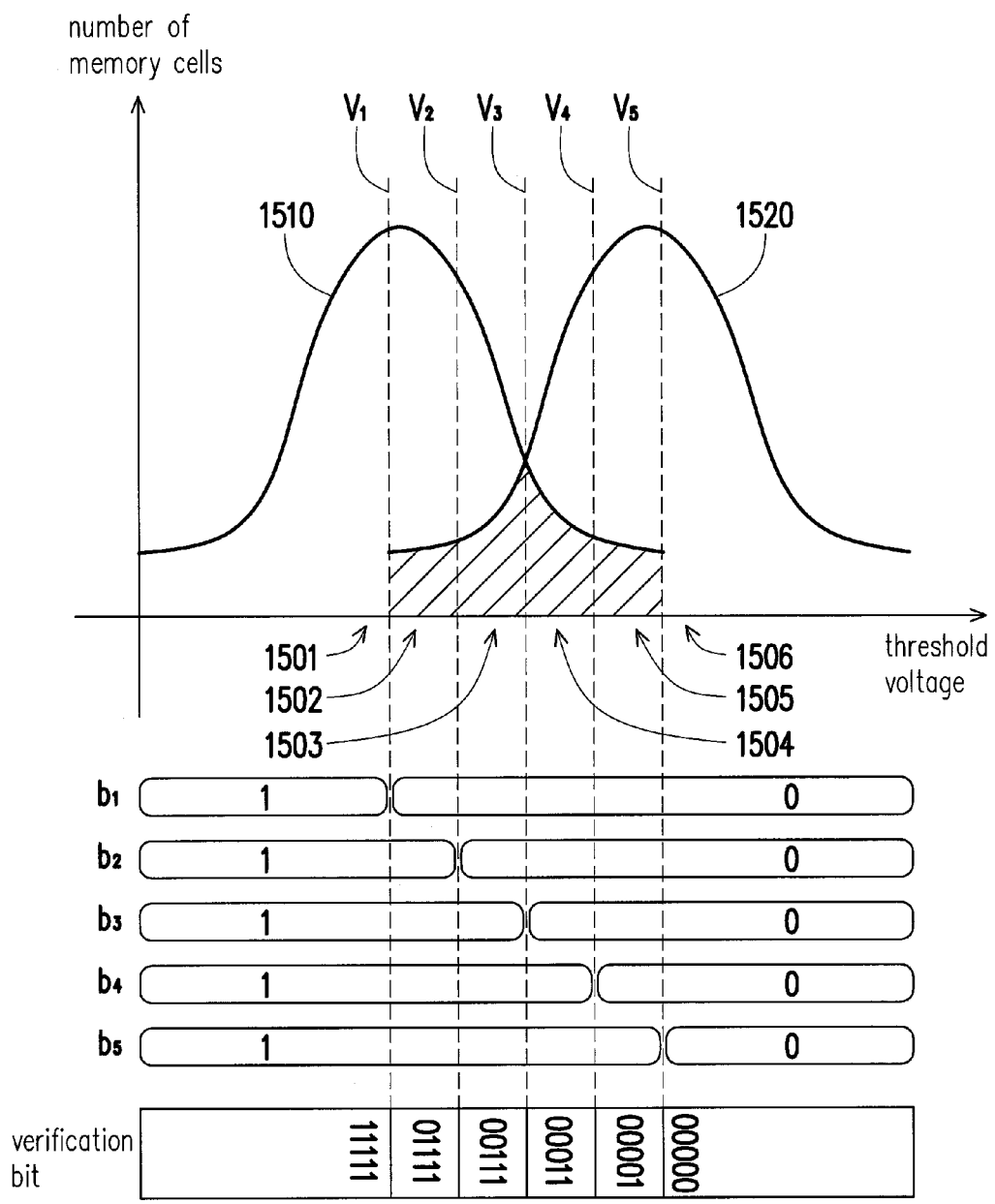
FIG. 13 illustrates a schematic diagram for reading a verification bit according to an exemplary embodiment.

FIG. 13 illustrates a schematic diagram for reading a verification bit according to an exemplary embodiment. Referring to FIG. 13, it is assumed that the memory cell in a storage status 1510 stores the bit "1", and the memory cell in a storage status 1520 stores the bit "0". The storage status 1510 may be partially overlapped with the storage status 1520, namely, under some specific read voltages, a part of memory cells in the storage status 1510 may be determined as belonging to the storage status 1520, and a part of memory cells in the storage status 1520 may be determined as belonging to the storage status 1510. When a read voltage is applied to the control gate of the memory cell, the verification bit obtained by the memory management circuit 202 may be "0" or "1" depended on whether the channel of the memory cell is turned on. Hereinafter, it is assumed that the corresponding verification bit is "0" when the channel of the memory cell is not turned on, otherwise, it is "1". When the memory management circuit 202 applies read voltages $V_1$ to $V_5$ to one specific memory cell, 5 verification bits may be obtained by the memory management circuit 202. More specifically, the read voltage $V_1$ is corresponding to the verification bit $b_1$; the read voltage $V_2$ is corresponding to the verification bit $b_2$; the read voltage $V_3$ is corresponding to the verification bit $b_3$; the read voltage $V_4$ is corresponding to the verification bit $b_4$; and the read voltage $V_5$ is corresponding to the verification bit $b_5$. The memory management circuit 202 may obtain the verification bit from the verification bit $b_1$ to the verification bit $b_5$ in following manner: when the threshold voltage of one memory cell falls within an interval 1501, the verification bit is "11111"; when the threshold voltage of one memory cell falls within an interval 1502, the verification bit is "01111"; when the threshold voltage of one memory cell falls within an interval 1503, the verification bit is "00111"; when the threshold voltage of one memory cell falls within an interval 1504, the verification bit is "00011"; when the threshold voltage of one memory cell falls within an interval 1505, the verification bit is "00001"; and when the threshold voltage of one memory cell falls within an interval 1506, the verification bit is "00000".

In the present exemplary embodiment, one of the read voltages $V_1$ to $V_5$ is set to a sign read voltage. The sign read voltage is used to decide the data bit. For instance, in case the read voltage $V_3$ is a sign read voltage, the data bit is identical to the verification bit $b_3$; and in case the read voltage $V_2$ is the sign read voltage, the data is identical to the verification bit $b_2$, and the rest may be deduced by analogy. In each interval, based on the probability of the memory cell belonging to the storage status 1510 and the probability of the memory cell belonging to the storage status 1520, a log likelihood ratio (LLR) may be calculated, and the log likelihood ratio may also be referred to as the channel reliability message of the data bits in the present exemplary embodiment. In an exemplary embodiment, the log likelihood ratio corresponding to each of the intervals may be calculated and stored in a lookup table in advance. The memory management circuit 202 may input the verification bits $b_1$ to $b_5$ to the lookup table, so as to obtain the corresponding log likelihood ratio to serve as the channel reliability message. The obtained channel reliability message may be used to perform said iterative decoding (i.e., $L_1$ to $L_n$ in FIG. 12). In an exemplary embodiment, when different sign read voltages are set, the channel reliability message may be obtained by using different lookup tables.

It should be noted that, if the number of read voltage is x, the channel reliability message may include x+1 number of possible values, in which x is a positive integer. If the number of the read voltage is 1 (e.g., only the read voltage $V_3$ is used), the decoding procedure being performed is also referred to as a hard bit mode decoding procedure. If the number of the read voltage is greater than 1, the decoding procedure being performed is also referred to as a soft bit mode decoding procedure. Generally, information used by the soft bit mode decoding procedure is relatively more, such that more of error bits may be corrected, but an executing speed thereof is slower. Further, in an exemplary embodiment, when the hard bit mode decoding procedure is performed, the memory management circuit 202 may calculate the channel reliability message directly through the obtained verification bit without using the lookup table. For instance, in case the verification bit is "1", the channel reliability message may be set to y; and if the verification bit is "0", the channel reliability message may be set to −y, in which y is a real number.

In the present exemplary embodiment, the error checking and correcting circuit 208 includes a first correcting circuit and a second correcting circuit. When reading the data stored by a plurality of first memory cells from the rewritable non-volatile memory module 106, the memory management circuit 202 may read the first memory cells according to a first read voltage to obtain a plurality of first verification bits. The first correcting circuit may perform a first hard bit mode decoding procedure according to the first verification bits. For instance, the first correcting circuit may generate the channel reliability message according to the first verification bits, and perform the iterative decoding by using the channel reliability message. Nevertheless, the iterative decoding, the channel reliability message and the hard bit mode decoding procedure have been described above, thus related description is omitted hereinafter. The first correcting circuit may also determine whether the first bit mode decoding procedure generates the valid codeword (also known as a first valid codeword). If the valid codeword is generated by the first hard bit mode decoding procedure, the error checking and correcting circuit 208 may output the valid codeword. If the valid codeword is not generated by the first had bit mode decoding procedure, decoding is continued by the second correcting circuit. More specifically, the second correcting circuit may perform a second hard bit mode decoding procedure, and determine whether the second hard bit mode decoding procedure generates the valid codeword (also known as a second valid codeword). If the valid codeword is generated by the second hard bit mode decoding procedure, the error checking and correcting circuit 208 may output the valid codeword. Particularly, a precision (or a correcting capability) of the first correcting circuit is less than a precision of the second correcting circuit (or a correcting capability). In exemplary embodiment, the precision indicates the number of bits being used for representing the reliability message in the iterative decoding. In other words, in comparison to the first correcting circuit, the second correcting circuit uses more bits to represent the reliability message, thus the correcting capability of the second correcting circuit is better. Therein, in the present exemplary embodiment, the first correcting circuit may include the precision of 2 bits calculation, and the second correcting circuit may include the precision of 6 bits calculation. In addition, the first hard bit mode decoding procedure and the second hard bit mode decoding procedure may use the same algorithm or different algorithms, and the invention is not limited thereto. However, because the first verification bit is used by both the first correcting circuit and the second correcting circuit, the memory management circuit 202 may read the first memory cells without using other read voltages. Further, in the present exemplary embodiment, the first correcting circuit and the second correcting circuit may be circuits independent to each other. However, in another exemplary embodiment, the first correcting circuit may be at least a part of the second correcting circuit, or the first correcting circuit and the second correcting circuit may share use of the same circuit.

In the present exemplary embodiment, a low density parity code (LDPC) is used by the error checking and correcting circuit 208. However, in another exemplary embodiment, the error checking and correcting circuit 208 may also use a convolutional code, a turbo code, or other algorithms having the hard bit mode decoding procedure and the soft bit mode decoding procedure.

Figure 14:
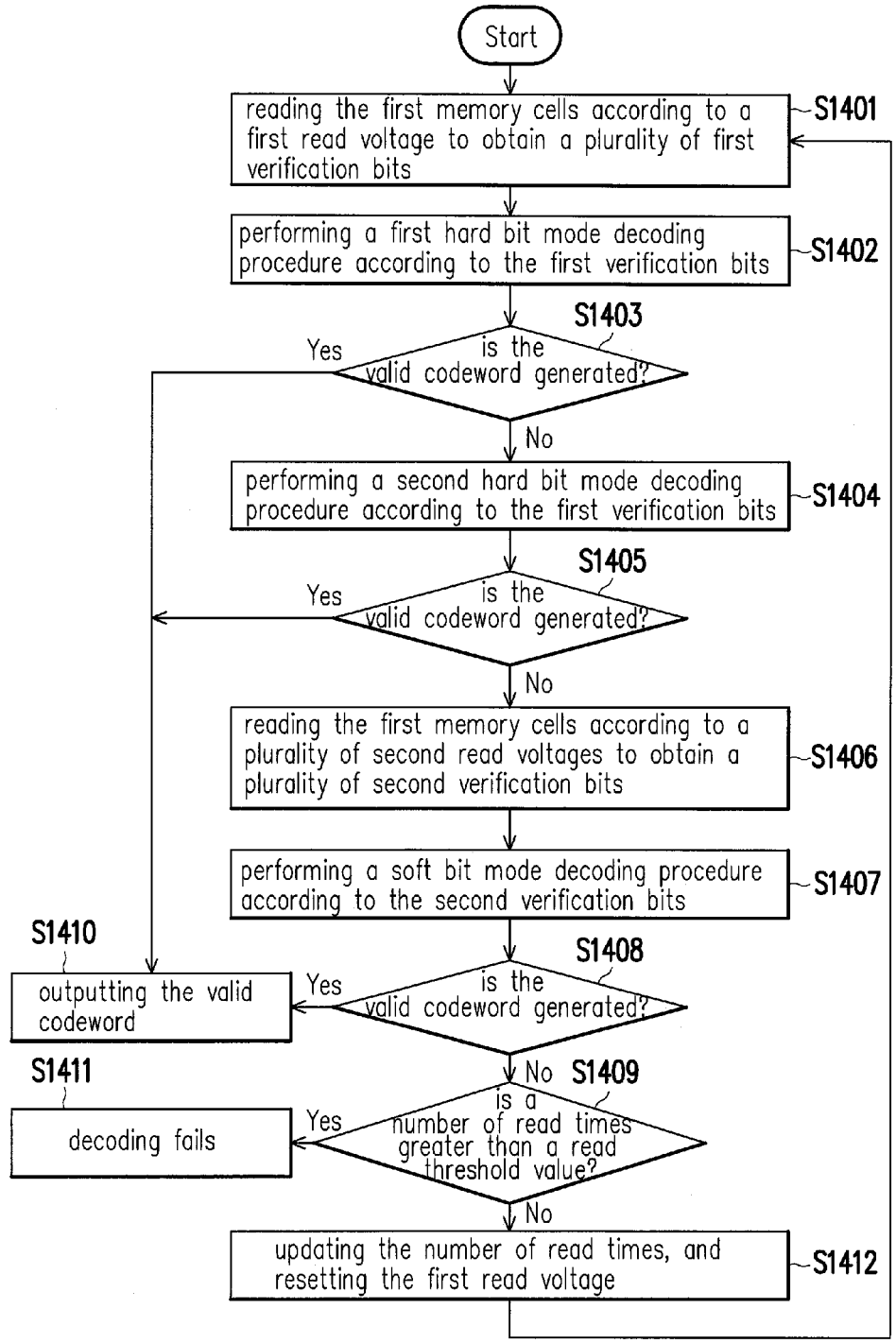
FIG. 14 is illustrates schematic diagram for decoding according to an exemplary embodiment.

FIG. 14 is illustrates schematic diagram for decoding according to an exemplary embodiment.

Referring to FIG. 14, in step S1401, the first memory cells are read according to a first read voltage to obtain a plurality of first verification bits. In step S1402, a first hard bit mode decoding procedure is performed according to the first verification bits. In step S1403, whether the valid codeword is generated is determined. If the valid codeword is generated, in step S1410, the valid codeword is outputted. If the valid codeword is not generated, in step S1402, a second hard bit mode decoding procedure is performed according to the first verification bits. In step S1405, whether the valid codeword is generated is determined. Nevertheless, steps S1401 to S1405 have been described in detail above, thus related description is omitted hereinafter.

In an exemplary embodiment, if it is determined that the valid codeword is not generated in step S1405, proceeding to step S1406 in which the memory management circuit 202 reads the first memory cells according to a plurality of second read voltages to obtain a plurality of second verification bits. Therein, the number of the second read voltages is greater than the number of the first read voltage. For instance, in case the number of the second read voltages is 5, the memory management circuit 202 may obtain 5 of the second verification bits from each of the first memory cells. In step S1407, a soft bit mode decoding procedure is performed according to the second verification bits by the second correcting circuit. Nevertheless, the soft bit mode decoding procedure have been described in detail above, thus related description thereof is omitted hereinafter. In step S1408, the second correcting circuit may determine whether the soft bit mode decoding procedure generates the valid codeword (also known as a third valid codeword). If the valid codeword is generated by the soft bit mode decoding procedure, the valid codeword is outputted in step S1410. If the valid codeword is not generated by the soft bit mode decoding procedure, the memory management circuit 202 determines whether the number of read times is greater than a read threshold value in step S1409. If the number of read times is greater than the read threshold value, the memory management circuit 202 determines that decoding fails in step S1411. If the number of read times is not greater than the read threshold value, the memory management circuit 202 may update the number of read times (e.g., added by one), and reset the first read voltage in step S1412. And, proceeding back to step S1401, the first memory cells are read according to the reset first read voltage to obtain the first verification bits again. In step S1402, the first correcting circuit may perform the first hard bit mode decoding procedure according to the first verification bits being obtained again, and its subsequent steps are omitted hereinafter.

Second Exemplary Embodiment

Figure 15:
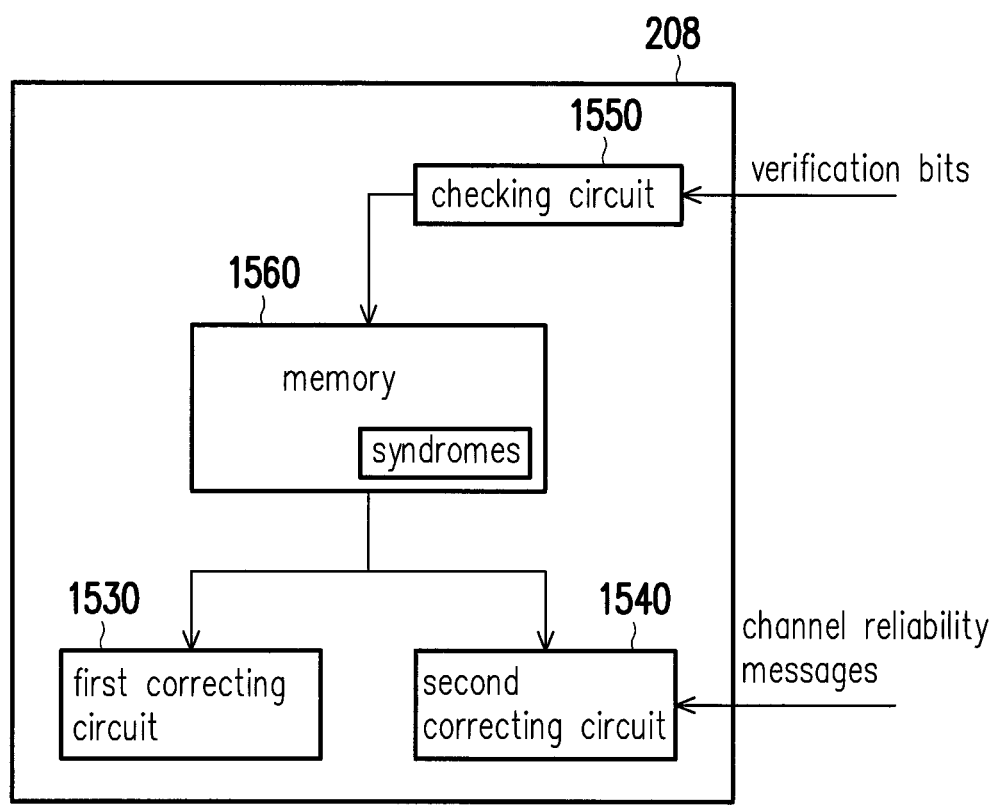
FIG. 15 is a schematic block diagram illustrating the error checking and correcting circuit 208 according to second exemplary embodiment.

FIG. 15 is a schematic block diagram illustrating the error checking and correcting circuit 208 according to second exemplary embodiment.

Referring to FIG. 15, the error checking and correcting circuit 208 includes a checking circuit 1550, a memory 1560, a first correcting circuit 1530 and a second correcting circuit 1540. After the verification bits are obtained by the memory management circuit 202, the checking circuit 1550 may generate the data bits according to the verification bits, and perform the parity check procedure on the data bits to generate a plurality of syndromes. For instance, the data bits may be decided according to the sign read signal, and the vector generated by the data bit may be multiplied by the parity check matrix to obtain the syndromes. Nevertheless, the sign read signal and the parity check procedure have been described above, thus related description thereof is omitted hereinafter. The generated syndromes may be stored in the memory 1560.

In the first hard bit mode decoding procedure, the second hard bit mode decoding procedure and/or the soft bit mode decoding procedure, the first correcting circuit 1530 and the second correcting circuit 1540 may generate an index of the error bit according to the syndromes. More specifically, in an iterative decoding of the low density parity code, a reliability message of each of the data bits may be obtained according to the syndromes, and the index of the error bit from the data bits may be decided according to the reliability messages. In the step of determining whether the valid codeword is generated, whether the index of the error bit and the syndromes comply with a parity criteria may be determined. If the index of the error bit and the syndromes comply with the parity criteria, the index of the error bits may be outputted, and the index of the error bit may be used to correct the data bits for generating the valid codeword. Lastly, the corrected data bits may be outputted. Exemplary embodiments are further provided below and served to describe different aspects of said algorithms.

Third Exemplary Embodiment

Referring back to FIG. 12, in third exemplary embodiment, the steps of obtaining the reliability message according to the syndromes may be represented by equations (6) to (9) below.

$$L_{i \to j} = (-2S_i + 1) \times \prod_{j' \in N(i)-\{j\}} \alpha_{j'i} \times \varphi\left(\sum_{j' \in N(i)-\{j\}} \varphi(\beta_{j'i})\right) \quad (6)$$

$$\varphi(x) = -\log\left(\tanh\left(\frac{x}{2}\right)\right) = \log\left(\frac{e^x + 1}{e^x - 1}\right) \quad (7)$$

$$\alpha_{ji} = \text{sign}(L_{j \to i}) \quad (8)$$

$$\beta_{ji} = |L_{j \to i}| \quad (9)$$

$S_i$ is the $i^{th}$ syndrome. $N(i)$ is the data bit (indicated as all the data nodes connected to the parity node 1332($i$)) corresponding to the $i^{th}$ syndrome. $\{j\}$ is a set defined by the $j^{th}$ data bit. In the first iteration, the reliability messages $L_{j \to i}$ are equal to the channel reliability message $L_j$.

Subsequently, the reliability message $L_{j \to i}$ may be updated according to an equation (10) below.

$$L_{j \to i} = L_j + \sum_{i' \in N(j)} L_{i' \to j} \quad (10)$$

A summed reliability message of each of the data bits may be calculated according to an equation (11) below.

$$L_j^{tot} = L_j + \sum_{i \in N(i)} L_{i \to j} \quad (11)$$

$L_j^{tot}$ is the summed reliability message of the jth data bit. Next, the first correcting circuit 1530 and/or the second correcting circuit 1540 may determine whether the summed reliability message of each of the data bits matches a threshold to decide the error bit and obtain an error index vector, and the length of the error index vector is equal to the length of the codeword. For instance, steps for obtaining the error index vector may be represented by an equation (12) below.

$$e_j = \begin{cases} 1 & \text{if } L_j^{tot} < 0 \\ 0 & \text{otherwise} \end{cases} \quad (12)$$

e is an error index vector, in which $e_1$ to $e_n$ are included. $e_j$ represents a $j^{th}$ index in the error index vector. In case $e_j$ is equal to 1, it indicates that the $j^{th}$ data bit in the codeword is the error bit.

Lastly, the first correcting circuit 1530 and/or the second correcting circuit 1540 may perform a mod 2 multiplication on the parity check matrix and the error index vector to obtain a first vector, and determine whether the first vector is identical to the vector generated by the syndromes. In case the first vector is identical to the vector generated by the syndromes, it indicates that the index of the error bit and the syndromes comply with the parity criteria. In this case, the iterative decoding may be stopped, and the error index vector may be outputted. In other words, the iterative decoding is stopped when an equation (13) below is complied with. Nonetheless, in case the equation (13) below is not complied with, a next iteration may be performed, namely, the equation (6) to (12) are repeated.

$$H \otimes e = s \quad (13)$$

It indicates that the valid codeword may be generated when the error index vector is outputted. More specifically, the error checking and correcting circuit 208 may update the data bit according to the error index vector, and the corrected data bits may generate the valid codeword. However, in said iterative decoding, if the index of the error bit and the syndromes constantly fail to comply with the parity criteria, and the iterative decoding is stopped because the number of iterations exceeds a preset value, it indicates that the valid codeword cannot be generated.

Fourth Exemplary Embodiment

The hard bit mode decoding procedure is adapted in fourth exemplary embodiment, an average value of the log likelihood ratios of all the data bits may be used as the channel reliability message, namely, all of the data bits include the same channel reliability message.

In a first iteration of fourth exemplary embodiment, regardless of what values of i and j are, the reliability message $L_{j \to i}$ refers to said channel reliability message (hereinafter, marked as $L_r$). The steps of obtaining the summed reliability message according to the syndromes may be represented by said equations (6) to (9) (which are repeatedly listed below), and following equations (14) to (15).

$$L_{i \to j} = (-2S_i + 1) \times \prod_{j' \in N(i)-\{j\}} \alpha_{j'i} \times \varphi\left( \sum_{j' \in N(i)-\{j\}} \varphi(\beta_{j'i}) \right) \quad (6)$$

$$\varphi(x) = -\log\left(\tanh\left(\frac{x}{2}\right)\right) = \log\left(\frac{e^x + 1}{e^x - 1}\right) \quad (7)$$

$$\alpha_{ji} = \text{sign}(L_{j \to i}) \quad (8)$$

$$\beta_{ji} = |L_{j \to i}| \quad (9)$$

$$L_{j \to i} = L_r + \sum_{i' \in N(j)} L_{i' \to j} \quad (14)$$

$$L_j^{tot} = L_r + \sum_{i \in N(i)} L_{i \to j} \quad (15)$$

In addition, steps for obtaining the error index vector and determining whether the index of the error bit and the syndromes comply with the parity criteria are the same to said equations (12) and (13), thus related descriptions thereof are omitted hereinafter.

Fifth Exemplary Embodiment

In fifth exemplary embodiment, the equation (6) may be approached by calculating with a minimal value. More specifically, the steps of obtaining the reliability message according to the syndromes may be represented by an equation (16) below and said equations (8) to (9) (which are repeatedly listed below).

$$L_{i \to j} = (-2S_i + 1) \times \prod_{j' \in N(i)-\{j\}} \alpha_{j'i} \times \min_{j' \in N(i)-\{j\}} \beta_{j'i} \quad (16)$$

$$\alpha_{ji} = \text{sign}(L_{j \to i}) \quad (8)$$

$$\beta_{ji} = |L_{j \to i}| \quad (9)$$

Steps for calculating the summed reliability messages, obtaining the index vector, and determining whether the parity criteria are complied with, are all the same to that described in third exemplary embodiment or fourth exemplary embodiment, thus related descriptions are omitted hereinafter. It should be noted that, the equation (16) may be used in the hard bit mode decoding procedure or the soft bit mode decoding procedure, and the invention is not limited thereto.

Sixth Exemplary Embodiment

In sixth exemplary embodiment, when the reliability messages are calculated according to the syndromes, the vector generated by the syndromes is multiplied by the parity check matrix to obtain a vector (also known as a second vector), which may be represented by an equation (17) below.

$$f = s^T \cdot H \quad (17)$$

f is the second vector having a dimension being 1-by-n, and including the reliability message of each of the data bits. It should be noted that, a multiplication used in the equation (17) is an ordinary matrix multiplication instead of the mod 2 matrix multiplication. Accordingly, in case a value of one element in the vector f gets greater, it indicates that an error probability for that data bit is greater.

Subsequently, the index of the data bit is decided according to one of elements in the first vector f having a maximal value. Hereinafter, it is assumed that, the $e^{th}$ element in the vector f has the maximal value, in which e is a positive integer. When it comes to determine whether the syndromes and the index of the error bit comply with the parity criteria, according to the index e, the first correcting circuit 1530 and/or the second correcting circuit 1540 may select a $e^{th}$ column (also known as an error correction column) from among a plurality of columns in the parity check matrix H, and updates the syndromes according to such $e^{th}$ column. For instance, steps for updating the syndromes may be represented by an equation (18) below.

$$s = s + h_e \quad (18)$$

$h_e$ is a $e^{th}$ column in the parity check matrix H. An addition used in the equation (18) is a mod 2 addition. Lastly, whether the vector generated by the syndromes after being updated is a zero vector is determined. In case the vector generated by the syndromes after being updated is the zero vector (i.e., all of the elements in the vector s are 0), it indicates that the parity criteria are complied with, so that the iterative decoding is stopped, and the index e generated in each of the iteration may be outputted. In case the vector generated by the syndromes after being updated is not the zero vector, the next iteration is performed, namely, the equations (17) to (18) are repeatedly performed.

Seventh Exemplary Embodiment

Referring back to FIG. 15, in seventh exemplary embodiment, the first hard bit mode decoding procedure, the second hard bit mode decoding procedure, and the soft bit mode decoding procedure may be any algorithm used in third exemplary embodiment through sixth exemplary embodiment, or an traditional algorithm for calculating the reliability message. In addition, the first hard bit mode decoding procedure, the second hard bit mode decoding procedure, and the soft bit mode decoding procedure may use the same algorithm or different algorithms, and the invention is not limited thereto. Particularly, the syndromes may be reused because they are stored in the memory 1560. For instance, in case the syndromes are used by both the first hard bit mode decoding procedure and the second hard bit mode decoding procedure to update the reliability message, it is not required for the second correcting circuit 1540 to calculate the syndromes again when performing the second hard bit mode decoding procedure, instead, the syndromes may be obtained directly from the memory 1560.

Figure 16:
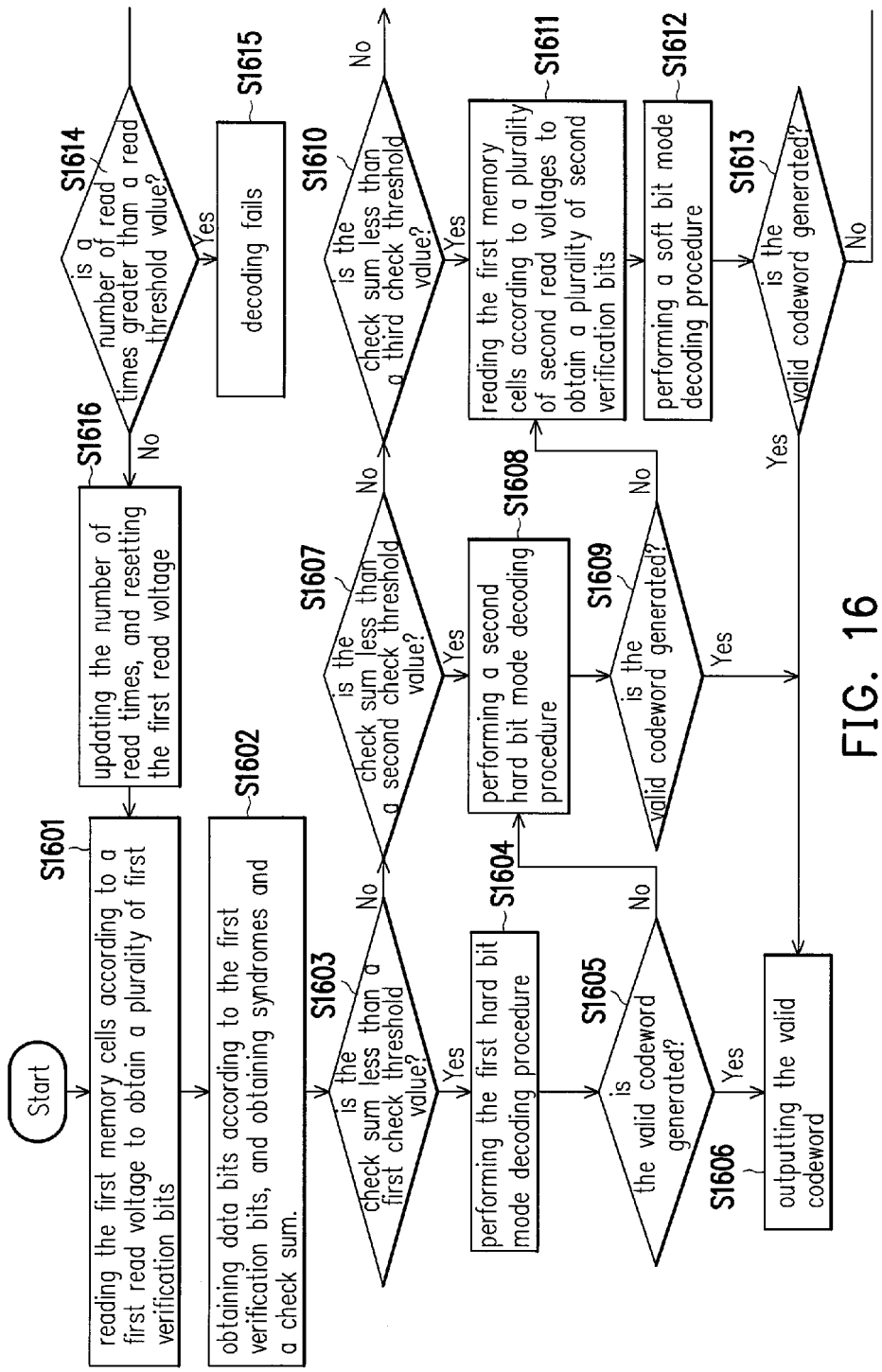
FIG. 16 illustrates a flowchart for a decoding according to seventh exemplary embodiment.

The syndromes may be used to the estimate the number of the error bits. For example, it indicates that the number of the error bits in the codeword is relatively more when the number of the syndromes being "1" is more. Accordingly, in seventh exemplary embodiment, the syndromes may also be used to decide a decoding process. FIG. 16 illustrates a flowchart for a decoding according to seventh exemplary embodiment. Referring to FIG. 16, in step S1601, the first memory cells are read according to a first read voltage to obtain a plurality of first verification bits. In step S1602, data bits are obtained according to the first verification bits, and syndromes and a check sum are then obtained. For instance, the check sum is a sum of all the syndromes (with the normal addition instead of the modular 2 addition). In step S1603, whether the check sum is less than a first check threshold value is determined. If the check sum is less than the first check threshold value, the first correcting circuit performs the first hard bit mode decoding procedure in step S1604, and determines whether the valid codeword is generated in step S1605. If the valid codeword is generated in step S1605, the valid codeword is outputted in step S1606.

If it is determined that the check sum is not less than the first check threshold value in step S1603, whether the check sum is less than a second check threshold value is determined in step S1607. If the check sum is less than the second check threshold value, or the valid codeword is not generated in step S1605, proceeding to step S1608 in which the second hard bit mode decoding procedure is performed by the second correcting circuit. In step S1609, whether the second hard bit mode decoding procedure generates the valid codeword is determined. If the valid codeword is generated, proceeding to step S1606 in which the valid codeword is outputted.

If it is determined that the check sum is not less than the second check threshold value in step S1607, whether the check sum is less than a third check threshold value is determined in step S1610. If the check sum is less than the third check threshold value or the valid codeword is not generated in step S1609, proceeding to step S1611 in which the first memory cells are read according a plurality of second read voltages to obtain a plurality of second verification bits. Subsequently, the second correcting circuit performs the soft bit mode decoding procedure in step S1612, and determines whether the valid codeword is generated in step S1613. If the valid codeword is generated in step S1613, proceeding to step S1606 in which the valid codeword is outputted.

If the valid codeword is not generated in step S1613, or it is determined that the check sum is not less than the third check threshold value, proceeding to step S1614 in which whether the number of read times is greater than a read threshold value is determined. If the number of read times is greater than the read threshold value, it indicates that decoding fails (step S1615). If the number of read times is not greater than the read threshold value, the number of read times is update and the first read voltage is reset in step S1616, then returning back to step S1601.

In the present exemplary embodiment, the first check threshold value is less than the second check threshold value, and the second check threshold value is less than the third check threshold value. However, values of the first check threshold value, the second check threshold value, and the third check threshold value are not particularly limited in the invention.

Eighth Exemplary Embodiment

In eight exemplary embodiment, a Quasi-Cyclic Low-Density Parity-Check Codes (QC-LDPC) is used. More specifically, a parity check matrix includes a plurality of permutation matrices and a plurality of zero matrices, which may be represented by an equation (19) below.

$$H = \begin{bmatrix} A_{11} & \cdots & A_{1T} \\ \vdots & \ddots & \vdots \\ A_{C1} & \cdots & A_{CT} \end{bmatrix} \quad (19)$$

$A_{11}$ to $A_{CT}$ may be the permutation matrices or the zero matrices, in which C and T are positive integers. A dimension of each of the permutation matrices or the zero matrices is b-by-b, wherein b is a positive integer. However, values of the positive integers C, T, and b are not particularly limited in the invention. Each of the permutation matrices is generated by shifting an identity matrix in right, left, up or down directions, such that the permutation matrices may be represented by indexes. For instance, if one specific permutation matrix is generated by shifting the identity matrix for two columns in right direction, the corresponding index may be set to 2. In addition, the index corresponding to the zero matrix may be set to one specific value, such as −1. Therefore, the parity check matrix may be represented by a plurality of indexes, as shown in an equation (20) below.

$$H \equiv \begin{bmatrix} a_{11} & \cdots & a_{1T} \\ \vdots & \ddots & \vdots \\ a_{CT} & \cdots & a_{CT} \end{bmatrix} \quad (20)$$

Therein, $a_{11}$ to $a_{CT}$ are real numbers representing said indexes. In the present exemplary embodiment, the indexes may constitute the parity check matrix information, and to be encoded by using an error correcting code (e.g., the BCH code) to generate a first data, and the first data is stored in the rewritable non-volatile memory module 106. The parity check matrix information may be used to rebuild the parity check matrix. In the present exemplary embodiment, the memory management circuit 202 may read the parity check matrix information from the rewritable non-volatile memory module 106 during start up, so as to change the current parity check matrix. However, the memory management circuit 202 may also read the parity check matrix information at any time point, and the invention is not limited thereto.

Figure 17:
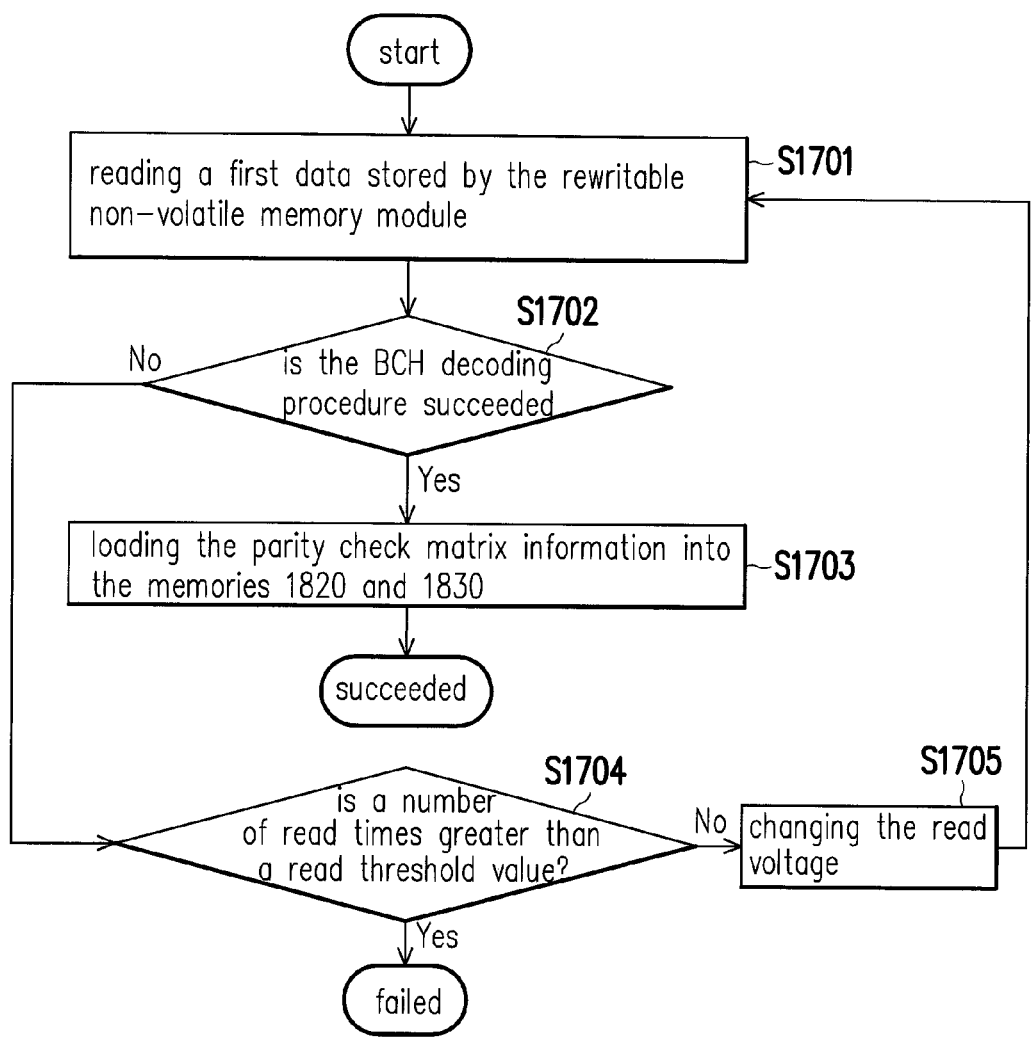
FIG. 17 illustrates a flowchart for reading a parity check matrix information according to eighth exemplary embodiment.
Figure 18:
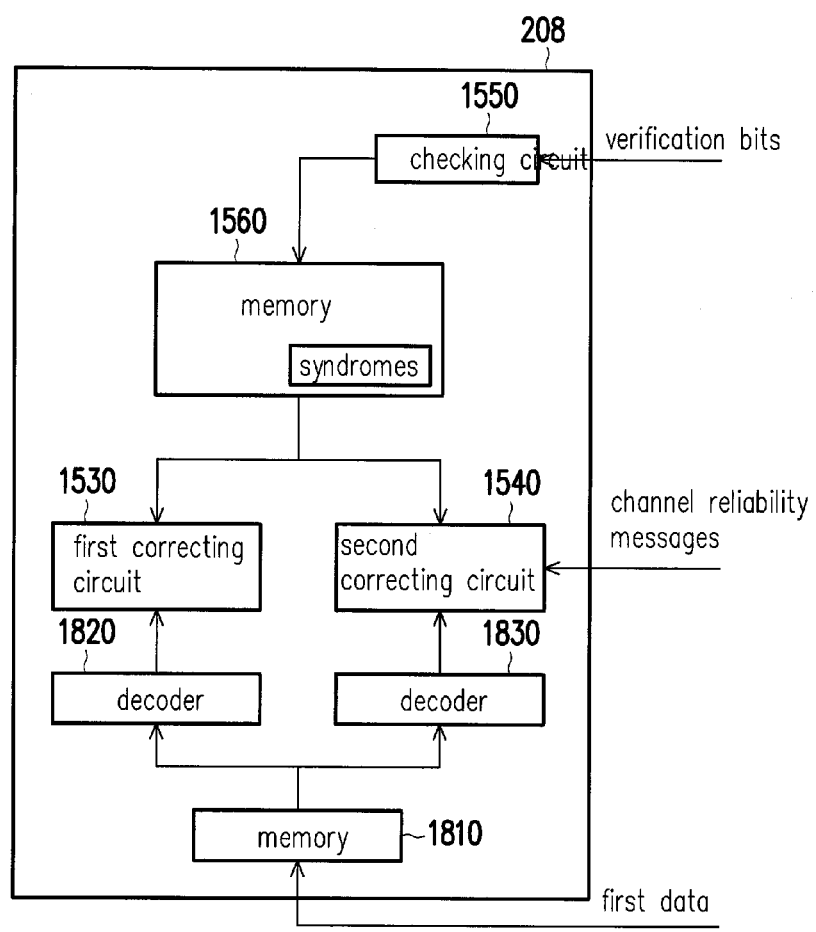
FIG. 18 is a block diagram illustrating the error checking and correcting circuit according to eighth exemplary embodiment.

FIG. 17 illustrates a flowchart for reading a parity check matrix information according to eighth exemplary embodiment. FIG. 18 is a block diagram illustrating the error checking and correcting circuit according to eighth exemplary embodiment.

Referring to FIG. 17 and FIG. 18, other than the elements depicted in FIG. 15, in eighth exemplary embodiment, the error checking and correcting circuit 208 further includes memories 1820, 1830, and a decoder 1810. In step S1701, the memory management circuit 202 reads a first data stored by the rewritable non-volatile memory module 106. The read first data is transmitted to the decoder 1810. The decoder 1810 performs a BCH decoding procedure on the first data, and determines whether the BCH decoding procedure is succeeded (step S1702). If the decoding procedure is not succeeded in step S1702, the memory management circuit 202 may determine whether the number of read times is greater than a read threshold value in step S1704. If the number of read times is greater than the read threshold value, it indicates that loading of the parity check matrix information is failed. If the number of read times is not greater than the read threshold value, the memory management circuit 202 may update the number of reads and change the read voltage in step S1705, and then returning back to step S1701.

On the other hand, if the decoding procedure is succeeded in step S1702, the decoder 1810 may obtain the parity check matrix information and load the parity check matrix information into the memories 1820 and 1830 (step S1703). The first correcting circuit 1530 may set at least one parameter (also known as a first parameter) of the first correcting circuit 1530 according to the parity check matrix information in the memory 1820, and such parameter is used to perform the first hard bit mode decoding procedure. The second correcting circuit 1540 may set at least one parameter (also known as a second parameter) of the first correcting circuit 1540 according to the parity check matrix information in the memory 1830, and such parameter is used to perform the second hard bit mode decoding procedure.

Figure 19:
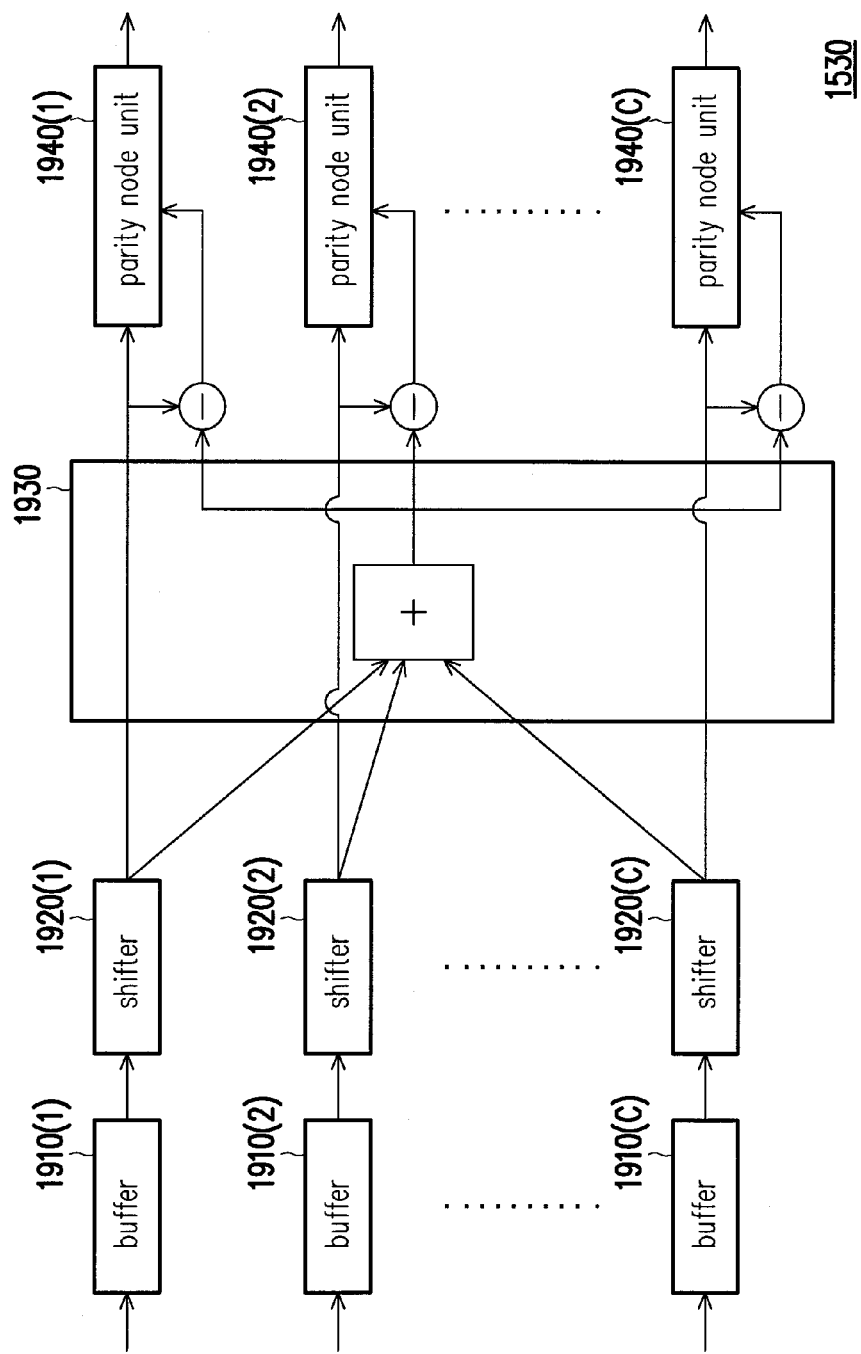
FIG. 19 is a block diagram illustrating the correcting circuit according to eighth exemplary embodiment.

FIG. 19 is a block diagram illustrating the correcting circuit according to eighth exemplary embodiment.

Referring to FIG. 19, the first correcting circuit 1530 includes buffers 1910(1) to 1910(C), shifters 1920(1) to 1920(C), a data node unit 1930, and parity node units 1940(1) to 1940(C). Therein, the data node unit 1930 is configured to implement the steps of updating the reliability message $L_{j \rightarrow i}$, and the parity node units 1940(1) to 1940(C) are configured to implement the steps of updating the reliability message $L_{i \rightarrow j}$. The reliability messages calculated by the parity node units 1940(1) to 1940(C) may be transmitted back to the buffers 1910(1) to 1910(C). The parity check matrix information is used to set parameters in the shifters 1920(1) to 1920(C). Particularly, based on different parity check matrix information, different parameters may be set in the shifters 1920(1) to 1920(C) thereby implementing different parity check matrices. An architecture of the first correcting circuit 1530 may also be referred to as a shuffle schedule or a shuffle network. In the present exemplary embodiment, the first correcting circuit 1530 adopts a parallel architecture. However, in other exemplary embodiments, a serial architecture or a combination thereof may also be adopted, and the invention is not limited thereto. In addition, an architecture of the second correcting circuit 1540 is similar to that of the first correcting circuit 1530, but both correcting circuits may adopted the same architecture or different architectures (e.g., one being parallel while another being serial), and the invention is not limited thereto.

Ninth Exemplary Embodiment

In the exemplary embodiment, the memory management circuit 202 resets a read voltage further according to the syndromes. To be specific, the memory management circuit 202 first transmits a read command sequence (also referred as first read command sequence) to the rewritable non-volatile memory module 106 for instructing to read the first memory cells according to the first read voltage to obtain a plurality of first verification bits. The ECC circuit 208 performs a parity check procedure according to the first verification bits to obtain a plurality of first syndromes. Next, the memory management circuit 202 decides a second read voltage different from the first read voltage according to the first syndromes. In addition, the memory management circuit 202 transmits another read command sequence (also referred as second read command sequence) to the rewritable non-volatile memory module 106 for instructing to read the first memory cells according to the second read voltage to obtain a plurality of second verification bits. After obtaining the second verification bits, the ECC circuit 208 performs a first decoding procedure according to the second verification bits. The first decoding procedure may be the hard bit mode decoding procedure or the soft bit mode decoding procedure, which is not limited in the invention. In one exemplary embodiment, since the second read voltage is obtained according to the first syndromes, times of repeating reading may be reduces; alternatively, the first decoding procedure may have better correction ability, but the invention does not limit the advantage of adjusting the read voltage according to the syndromes.

Figure 20:
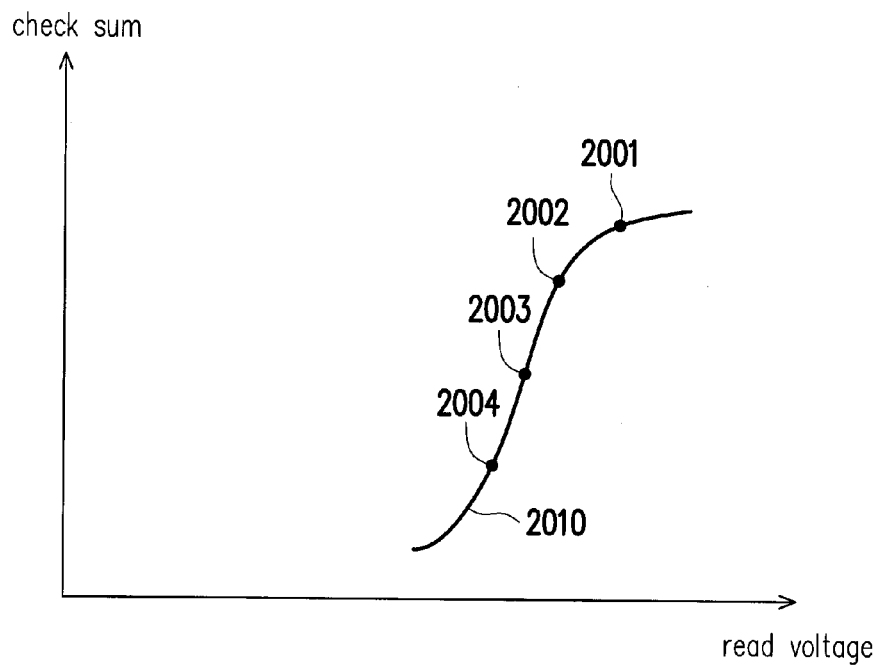
FIG. 20 is a schematic block diagram illustrating not complying with a balance criteria according to one exemplary embodiment.
Figure 21:
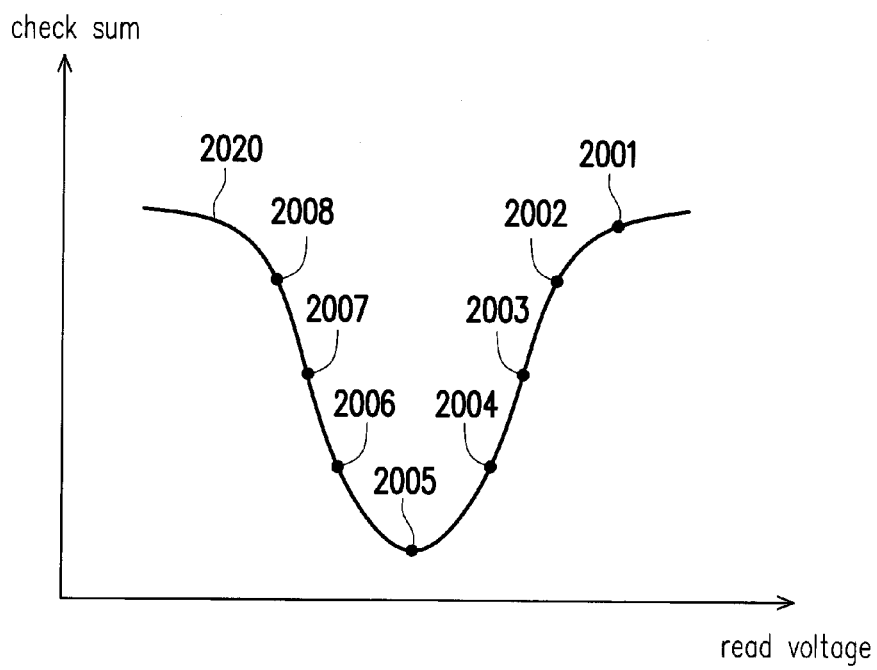
FIG. 21 is a schematic block diagram illustrating complying with a balance criteria according to one exemplary embodiment.

For example, the memory management circuit 202 may calculates a check sum according to the first syndromes. The memory management circuit 202 updates check sum information according to the check sum, and determines if the check sum information complies with a balance criteria. FIG. 20 is a schematic block diagram illustrating not complying with a balance criteria according to one exemplary embodiment. Please refer to FIG. 20, in which the horizontal axis is read voltage, and vertical axis is check sum. Assume the memory management circuit 202 has read the first memory cells 4 times, and calculated a corresponding check sum after each reading, as illustrated as points 2001~2004. In the FIG. 20, the check sum information may be represented as a curve 2010 (or a function), that is, the memory management circuit 202 may generate a corresponding curve after obtaining a new check sum. The balance criteria represents that whether the curve 2010 is symmetrical, and the balance criteria is satisfied if it is symmetrical. Herein, the points 2001~2004 do not satisfy the balance criteria. FIG. 21 is a schematic block diagram illustrating complying with a balance criteria according to one exemplary embodiment. Please refer to FIG. 21, the curve 2020 formed by the points 2001~2008 is nearly symmetrical and it satisfies the balance criteria. Therefore, in the FIG. 20, the memory management circuit 202 decides how to adjust a read voltage by determining if the curve 2020 is symmetrical (i.e. determine if the check sum information satisfy the balance criteria).

In one exemplary embodiment, the check sum information is a check sum vector. After each time of reading the first memory cells and obtaining the corresponding check sum, the memory management circuit 202 adds the check sum into the check sum vector. The memory management circuit 202 also obtains a differential vector of the check sum vector, and calculates a sum of the differential vector. In the exemplary embodiment, the balance criteria are used to determine whether the sum of the differential vector is less than a balance threshold. For example, if the sum of the differential is less than the balance threshold, the memory management circuit 202 increases the read voltage; otherwise decreases the read voltage. However, the differential vector has a direction, and the invention does not limit the direction of the differential vector and not limit the magnitude of the balance threshold.

In one exemplary embodiment, the memory management circuit 202 adjusts the read voltage according to a read voltage table recording a plurality of shift value. For example, the read voltage table may be represented as [−0.5; −0.25; −0.05; 0.05; 0.25; 0.5], and if the memory management circuit 202 selects the shift value "−0.5", it substrates 0.5 volt from the first read voltage to obtain the second read voltage. In the exemplary embodiment, the shift values in the read voltage table are arranged increasingly, but it should not be construed as limitations of the invention. If the sum of the differential is less than the balance threshold, the memory management circuit 202 selects one of the shift values along a first direction so as to increase the read voltage; and if the sum of the differential vector is greater than or equal to the balance threshold, the memory management circuit 202 selects one of the shift values along a second direction so as to decrease the read voltage. For, example, when the shift values in the read voltage table are arranged increasingly, the first direction is right and the second direction is left, but it should not be construed as limitations of the invention.

Figure 22:
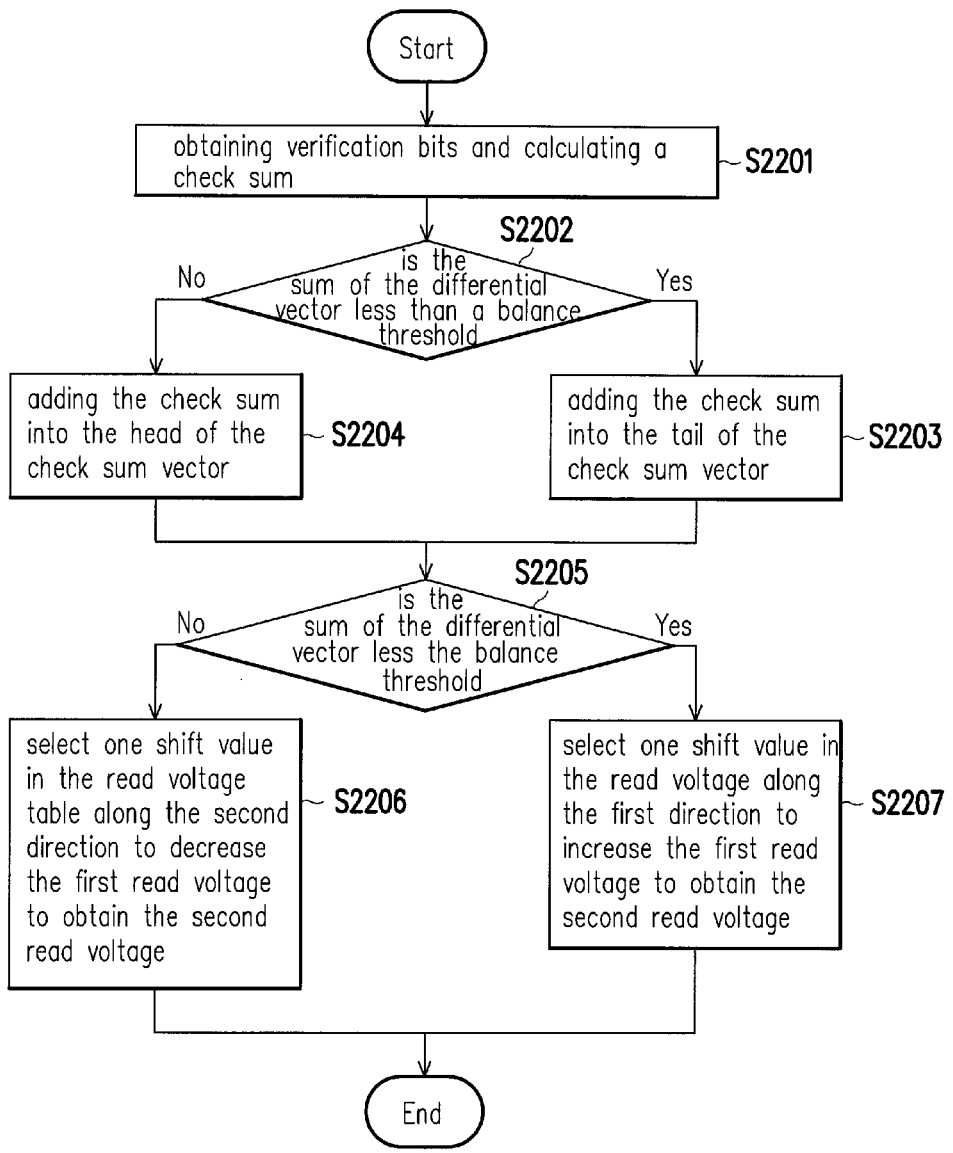
FIG. 22 illustrates a flowchart for adjusting a read voltage according to one exemplary embodiment.

Table 1 describes an example for obtaining the second read voltage. Every row in the Table 1 represents one reading, and therefore, the length of the check sum vector increases with the number of read times. In the exemplary embodiment of Table 1, the balance threshold is 0, and the shift values in the read voltage table are not used repeatedly. FIG. 22 illustrates a flowchart for adjusting a read voltage according to one exemplary embodiment.

TABLE 1

| check sum vector | differential vector | Sum of differential vector | Increase of decrease the read voltage |
|---|---|---|---|
| [300, 320, 350] | [20, 30] | 50 | decrease |
| [380, 300, 320, 350] | [−80, 20, 30] | −30 | increase |
| [380, 300, 320, 350, 410] | [−80, 20, 30, 60] | 30 | decrease |
| [450, 380, 300, 330, 350, 410] | [−70, −80, 20, 30, 60] | −40 | increase |

Please refer to the Table 1 and FIG. 22, in the step S2201, verification bits are obtained and a check sum is calculated. For example, the check sum vector is currently [300, 320, 350], and the newly obtained check sum is "380".

In step S2202, whether the sum of the differential vector is less than the balance threshold is determined. For example, the sum of the differential vector right now is "50".

If the sum of the differential vector is less than the balance threshold, in the step S2203, the check sum is added into the tail of the check sum vector. In detail, if the check sum vector is noted as "cs", and the new obtained check sum is noted as "chksum", then the step S2203 can be represented as "cs=[cs chksum]".

If the sum of the differential vector is greater than or equal to the balance threshold, in step S2204, the check sum is added into the head of the check sum vector. As noted above, the step S2204 can be represented as "cs=[chksum cs]". For example, the updated check sum vector is [380, 300, 320, 350].

In step S2205, whether the sum of the differential vector is less the balance threshold is determined. For example, the sum of the updated differential vector is "−30", which is less than the balance threshold.

If the result of the step S2205 is "no", then in S2206, one shift value in the read voltage table is selected along the second direction to decrease the first read voltage to obtain the second read voltage. If the sum of the updated differential vector is less than the balance threshold, in step S2207, one shift value in the read voltage is selected along the first direction to increase the first read voltage to obtain the second read voltage. For example, after reading the memory cells according to the second read voltage, the obtained check sum is "410".

The table 1 is obtained by repeating the steps in the FIG. 22. In one exemplary embodiment, the values in the check sum vector correspond to the shift values in the read voltage table. If two shift values are adjacent in the read voltage table, then the corresponding two check sums in the check sum vector are adjacent. For example, the check sum "380" corresponds to the shift value "−0.5", the check sum "300" corresponds to the shift value "−0.25", and the check sum "320" corresponds to the shift value "−0.05".

In one exemplary embodiment, the rewritable non-volatile memory module 106 does not support the soft bit mode decoding procedure, that is, the memory management circuit 202 does not have the lookup table for obtaining the channel reliability messages. However, the memory management circuit 202 may establish a lookup table according to the verifications obtained in step S2201, and the established lookup can be used to perform the soft bit mode decoding procedure. To be specific, after the memory management circuit 202 transmitting the read command sequence for reading the first memory cells according to the second read voltage, the memory management circuit 202 obtains a plurality of second verification bits. Then, the memory management circuit 202 performs the parity check procedure according to the second verification bits to obtain a plurality of second syndromes. The memory management circuit 202 may perform the steps in FIG. 22 so as to adjust the second read voltage according to the second syndromes (i.e. re-decide the second read voltage). After re-deciding the second read voltage, the memory management circuit 202 transmits another read command sequence (also referred as third read command sequence), which is configured to instruct to read the first memory cells according to the re-decided second read voltage to re-obtain the second verification bits. Afterwards, the memory management circuit 202 determines if a repeat reading criteria is satisfied. If the repeat reading criteria is satisfied, the step of re-deciding the second read voltage, and the step of transmitting the third read command sequence are repeated, until the repeat reading criteria is not satisfied. If the repeat reading criteria is not satisfied, a lookup table is establish according to the verification bits (including the first verification bits, the second verification bits, and the re-obtained second verification bits) obtained in the step S2201 for performing the soft bit mode decoding procedure. For example, the memory management circuit 202 may add the first verification bits, the second verification bits, and the re-obtained second verification bits (normal addition, not addition of modulo 2) to obtain a plurality of verification values. For instance, if the first verification bits are "1100 . . . ", the second verification bits are "1101 . . . ", and the re-obtained second verification bits are "1010 . . . ", then the verification values are "3211 . . . ".

Then, the memory management circuit 202 obtains a plurality of channel reliability messages according to the verification values. For example, the memory management circuit 202 may input the verification values into a verification value lookup table, so as to obtain a corresponding relationship between the channel reliability messages and the verification values, where equal or similar verification values may correspond to the same channel reliability message. The memory management circuit 202 may also establish a new lookup table according to the verification values, where the new look up table records the said channel reliability messages. Therefore, for each data bit, the memory management circuit 202 can obtain the corresponding channel reliability message and the soft bit mode decoding procedure may be performed according to these channel reliability messages. It should be noted that the calculation of obtaining the channel reliability messages according to the verification values is used to estimate the LLR. However, as illustrated in FIG. 21, the estimated LLR may be more accurate when the check sum information satisfies the balance criteria. If it is in the situation of FIG. 20, then the estimated LLR may be relatively inaccurate. Therefore, the steps of adjusting the read voltage according to the balance criteria and the steps of obtaining the channel reliability message according to the verification values may be used together.

In one exemplary embodiment, the ECC circuit 208 may perform the hard bit mode decoding procedure after each time of adjusting the read voltage, and memory management circuit 202 will keep adjusting the read voltage if the hard bit mode decoding procedure cannot generate a valid codeword. However, when the number of read times is greater than a read threshold value (that is, the repeat reading criteria is not satisfied), the memory management circuit 202 stops the step of re-deciding the second read voltage, and the ECC circuit 208 performs the soft bit mode decoding procedure according to the collected verification bits.

Figure 23:
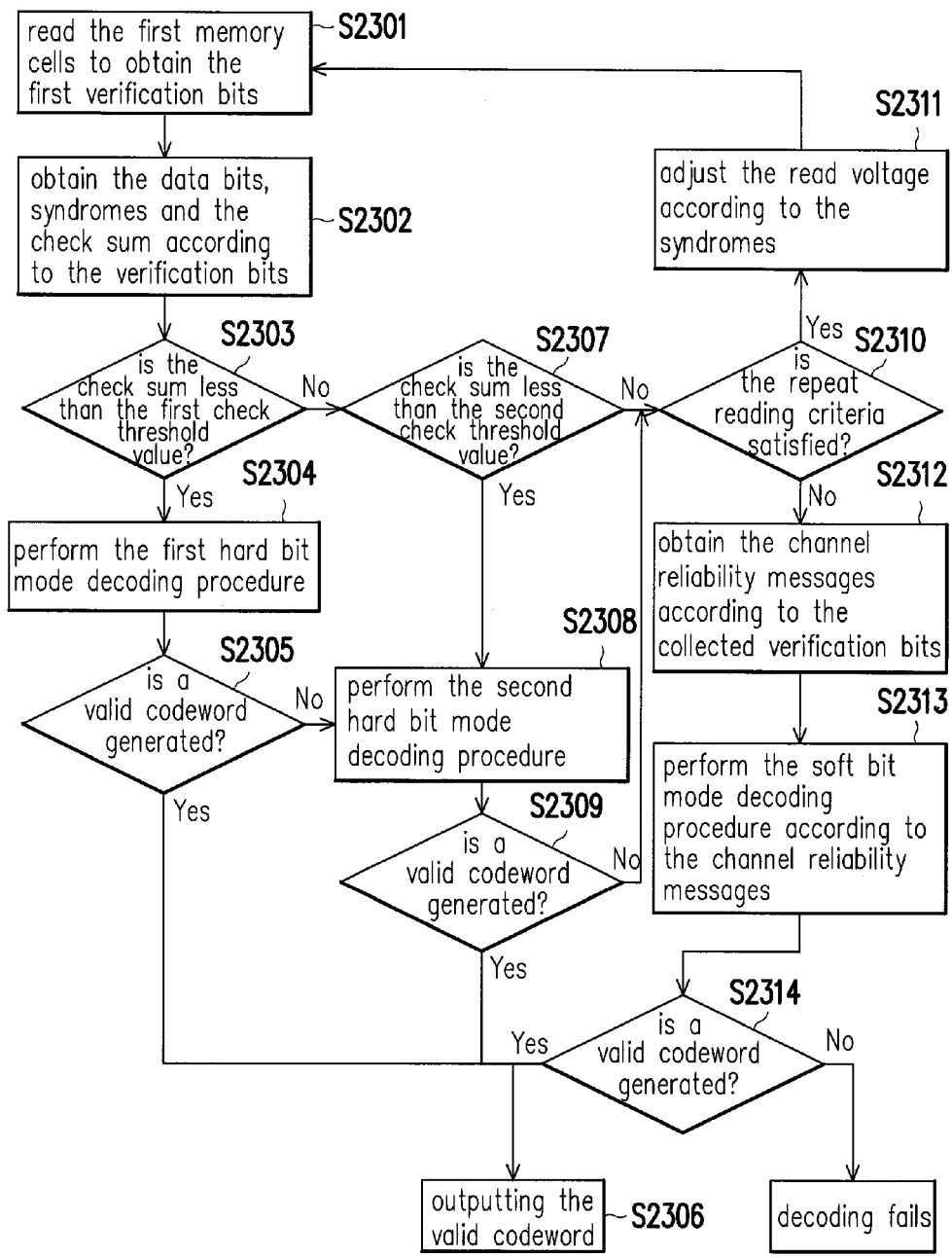
FIG. 23 illustrates a decoding flowchart according to a ninth exemplary embodiment.

FIG. 23 illustrates a decoding flowchart according to the ninth exemplary embodiment. Please refer to the FIG. 23, in step S2301, the first memory cells are read to obtain the first verification bits. In step S2302, the data bits, syndromes and the check sum are obtained according to the verification bits. In step S2303, whether the check sum is less than the first check threshold value is determined. If the check sum is less than the first check threshold value, the first hard bit mode decoding procedure is performed by the first correcting circuit in step S2304. In step S2305, whether a valid codeword is generated is determined. If a valid codeword is generated, in step S2306, the valid codeword is outputted.

If the check sum is equal to or greater than the first check threshold value, in step S2307, whether the check sum is less than the second check threshold value is determined. If the check sum is less than the second check threshold value, in step S2308, the second hard bit mode decoding procedure is performed by the second correcting circuit in step S2308. In step S2309, whether a valid codeword is generated is determined.

If a valid codeword is not generated in the step S2309, or the check sum is equal to or greater than the second check threshold value, in step S2310, whether the repeat reading criteria is satisfied is determined. In one exemplary embodiment, it is determined that if the number of read times is greater than a read threshold value in step S2310; it proceeds to step S2311 if the answer is "no", and proceeds to step S2312 if the answer is "yes". However, in another exemplary embodiment, whether the check sum information satisfies the balance criteria is determined in the step S2310; it proceeds to step S2312 is "yes", and step S2311 if "no". Alternatively, the two determinations may be combined, and the invention does not limit the content of step S2310.

In step S2311 the read voltage is adjusted according to the syndromes. Then, it goes back to the step S2301 to read the first memory cells.

In step S2312, the channel reliability messages are obtained according to the collected verification bits. In step S2313, the soft bit mode decoding procedure is performed according to the channel reliability messages. In step S2314, whether a valid codeword is generated is determined. If a valid codeword is not generated in the S2314, it means the decoding is fail.

In the exemplary embodiment of FIG. 23, the said first decoding procedure may be the decoding procedure performed in the step S2304, S2308 or S2313.

In another exemplary embodiment, it also determines whether the soft bit mode decoding procedure is supported such that the decoding method has different soft bit mode decoding procedures.

Figure 24:
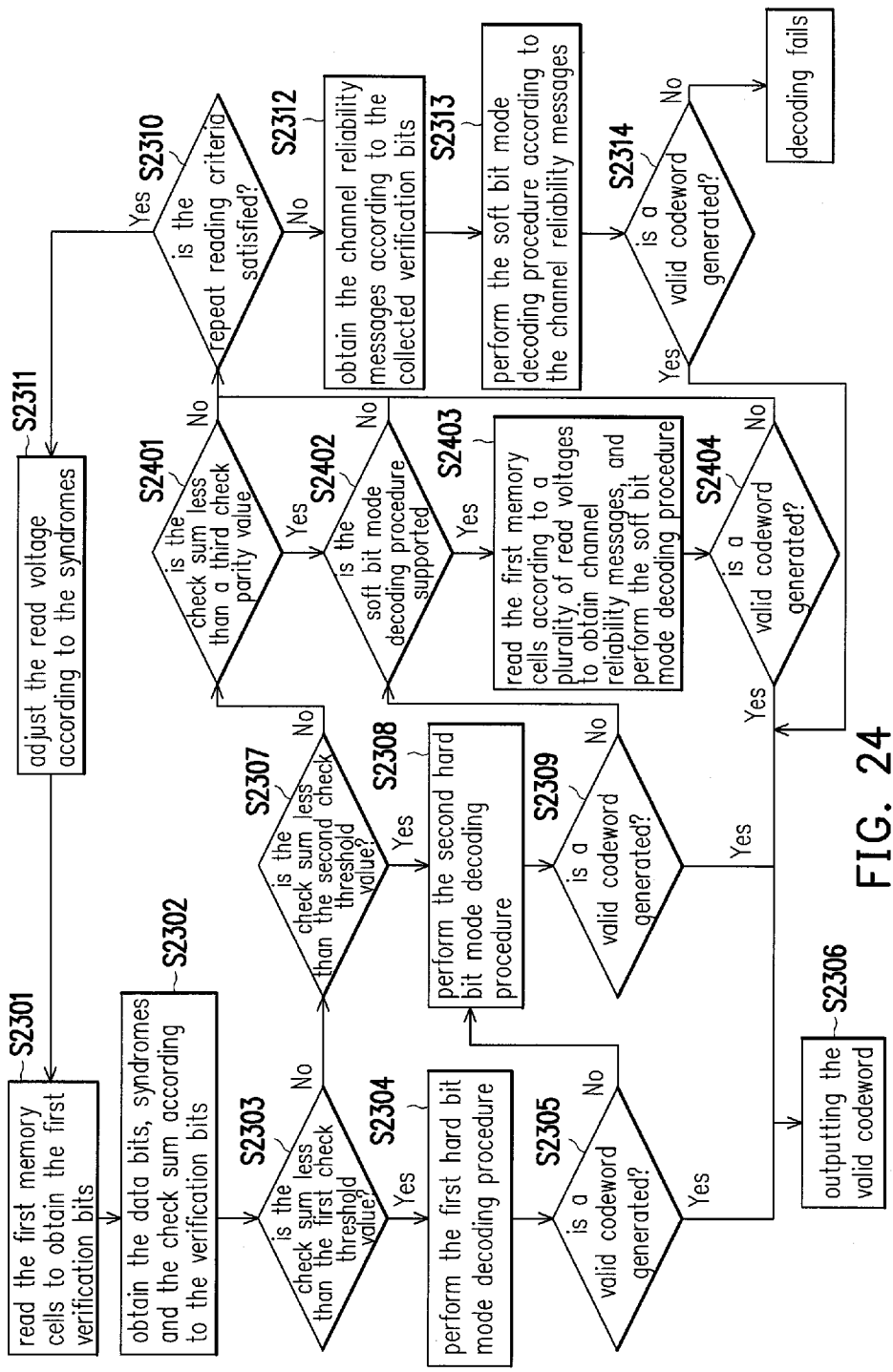
FIG. 24 illustrates a decoding flowchart according to another exemplary embodiment.

FIG. 24 illustrates a decoding flowchart according to another exemplary embodiment. Please refer to FIG. 24, where the steps S2301~S2311 are described in detail above, and they will not be repeated. If the check sum is greater than or equal to the second check threshold value, in step S2401, whether the check sum is less than a third check parity value is determined.

If the check sum is less than the third check threshold value, in step S2402, whether the soft bit mode decoding procedure is supported is determined. For example, the memory management circuit 202 may determine whether the soft bit mode decoding procedure is supported according to a variable or a flag. Or, the memory management circuit 202 may also determine whether the soft bit mode decoding procedure is supported according to an identification code of the rewritable non-volatile memory module 106. To be specific, the memory management circuit 202 may have at least one predetermined lookup table (recoding the channel reliability messages), and each predetermined lookup table corresponds to one identification code. The memory management circuit 202 may determine that if the identification code of the rewritable non-volatile memory module 106 is included in the identification code corresponding to the predetermined lookup table. If the result of the determination is "yes", then the memory management circuit 202 determines the soft bit mode decoding procedure is supported. If the determination is "no", then the memory management circuit 202 determines that the soft bit mode decoding procedure is not supported.

If the soft bit mode decoding procedure is supported, in step S2403, the first memory cells are read according to a plurality of read voltages to obtain channel reliability messages, and the soft bit mode decoding procedure is performed. In detail, the memory management circuit 202 may obtain the corresponding predetermined lookup table according to the identification code of the writable non-volatile memory module 106, input the verification bits into the predetermined lookup table to obtain the message reliability messages, and perform the soft bit mode decoding procedure according to the these channel reliability messages.

Afterwards, whether a valid codeword is generated is determined in step S2404. If the check sum is equal to or greater than the third check threshold value, the soft bit mode decoding procedure is not supported, or it does not generate a valid codeword in the step S2404, then it proceeds to the step S2310. It should be noted that although the soft bit mode decoding procedure is performed in both of the step S2403 and the step S2313, the channel reliability messages used in step S2403 is obtained via the predetermined lookup table, and the channel reliability messages used in step S2313 is estimated via the verification bits (i.e. a new lookup table is established).

Based on above, in the decoding method, the memory storage device, the memory controlling circuit unit proposed according to the exemplary embodiments of the invention, two correcting circuits with different precisions may be used for decoding thereby increasing the speed of decoding. Furthermore, in an exemplary embodiment, the parity check matrix may be dynamically changed without redesigning circuits. And, on-line channel reliability messages may be estimated to improve the correction ability. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A decoding method for a rewritable non-volatile memory module, wherein the rewritable non-volatile memory module comprises a plurality of first memory cells, and the decoding method comprises:

reading the first memory cells according to a first read voltage to obtain a plurality of first verification bits;

performing a first hard bit mode decoding procedure according to the first verification bits, and determining whether the first hard bit mode decoding procedure generates a first valid codeword by a first correcting circuit;

if the first valid codeword is generated by the first hard bit mode decoding procedure, outputting the first valid codeword;

if the first valid codeword is not generated by the first hard bit mode decoding procedure, performing a second hard bit mode decoding procedure according to the first verification bits, and determining whether the second hard bit mode decoding procedure generates a second valid codeword by a second correcting circuit, wherein a precision of the first correcting circuit is less than a precision of the second correcting circuit;

if the second valid codeword is generated by the second hard bit mode decoding procedure, outputting the second valid codeword.

2. The decoding method of claim 1, further comprising:

if the second valid codeword is not generated by the second hard bit mode decoding procedure, reading the first memory cells according to a plurality of second read voltages to obtain a plurality of second verification bits, and performing a soft bit mode decoding procedure according to the second verification bits by the second correcting circuit, wherein the number of the second read voltages is greater than the number of the first read voltage;

determining whether the soft bit mode decoding procedure generates a third valid codeword; and if the third valid codeword is generated by the soft bit mode decoding procedure, outputting the third valid codeword.

3. The decoding method of claim 2, further comprising:

if the third valid codeword is not generated by the soft bit mode decoding procedure, determining whether the number of read times is greater than a read threshold value;

if the number of read times is greater than the read threshold value, determining that decoding fails; and if the number of read times is not greater than the read threshold value, resetting the first read voltage, reading the first memory cells according to the reset first read voltage to re-obtain the first verification bits again, and performing the first hard bit mode decoding procedure according to the re-obtained first verification bits by the first correcting circuit.

4. The decoding method of claim 2, further comprising:

generating a plurality of data bits according to the first verification bits; and performing a parity check procedure on the data bits to generate a plurality of syndromes, wherein the step of performing the first hard bit mode decoding procedure according to the first verification bits comprises:
in an iterative decoding of a low density parity code, obtaining a reliability message of each of the data bits according to the syndromes, and deciding an index of an error bit from the data bits according to the reliability messages, wherein the step of determining whether the first bit mode decoding procedure generates the first valid codeword comprises:
determining whether the index of the error bit and the syndromes comply with a parity criteria; and
if the index of the error bit and the syndromes comply with the parity criteria, determining that the first valid codeword is generated by the first hard bit mode decoding procedure, wherein the step of outputting the first valid codeword comprises:
correcting the data bits according to the index of the error bits and outputting the corrected data bits.

5. The decoding method of claim 4, further comprising:

calculating a check sum according to the syndromes;

determining whether the check sum is less than a first check threshold value;

if the check sum is less than the first check threshold value, performing the first hard bit mode decoding procedure by the first correcting circuit;

if the check sum is greater than or equal to the first check threshold value, determining whether the check sum is less than a second check threshold value;

if the check sum is less than the second check threshold value, performing the second hard bit mode decoding procedure by the second correcting circuit;

if the check sum is greater than or equal to the second check threshold value, determining whether the check sum is less than a third check threshold value; and if the check sum is less than the third check threshold value, performing the soft bit mode decoding procedure by the second correcting circuit.

6. The decoding method of claim 1, wherein before the step of reading the first memory cells according to the first read voltages, the decoding method further comprises:

reading a parity check matrix information from the rewritable non-volatile memory module;

setting a first parameter of the first correcting circuit according to the parity check matrix information, wherein the first hard bit mode decoding procedure is performed according to the first parameter; and setting a second parameter of the second correcting circuit according to the parity check matrix information, wherein the second hard bit mode decoding procedure is performed according to the second parameter.

7. The decoding method of claim 6, wherein the step of reading the parity check matrix information comprises:

reading a first data from the rewritable non-volatile memory module; and performing a BCH decoding procedure on the first data to obtain the parity check matrix information.

8. The decoding method of claim 6, wherein the first hard bit mode decoding procedure and the second hard bit mode decoding procedure are corresponding to a Quasi-Cyclic Low-Density Parity-Check Code comprising a parity check matrix, the parity check matrix comprising a plurality of permutation matrices, and the parity check matrix information comprising an index of each of the permutation matrices.

9. A memory storage device, comprising:

a connection interface unit configured to couple to a host system;

a rewritable non-volatile memory module comprising a plurality of first memory cells; and a memory controlling circuit unit coupled to the connection interface unit and the rewritable non-volatile memory module, and comprising:
a memory management circuit configured to read the first memory cells according to a first read voltage to obtain a plurality of first verification bits;
a first correcting circuit configured to perform a first hard bit mode decoding procedure according to the first verification bits, and determine whether the first hard bit mode decoding procedure generates a first valid codeword; and
a second correcting circuit, wherein a precision of the first correcting circuit is less than a precision of the second correcting circuit, wherein if the first valid codeword is generated by the first hard bit mode decoding procedure, the first correcting circuit is configured to output the first valid codeword, if the first valid codeword is not generated by the first hard bit mode decoding procedure, the second correcting circuit is configured to perform a second hard bit mode decoding procedure according to the first verification bits, and determine whether the second hard bit mode decoding procedure generates a second valid codeword,
if the second valid codeword is generated by the second hard bit mode decoding procedure, the second correcting circuit is configured to output the second valid codeword.

10. The memory storage device of claim 9, wherein if the second valid codeword is not generated by the second hard bit mode decoding procedure, the memory management circuit is configured to read the first memory cells according to a plurality of second read voltages to obtain a plurality of second verification bits, and the second correcting circuit is configured to perform a soft bit mode decoding procedure according to the second verification bits, wherein the number of the second read voltages is greater than the number of the first read voltage,
the second correcting circuit is configured to determine whether the soft bit mode decoding procedure generates a third valid codeword,
if the third valid codeword is generated by the soft bit mode decoding procedure, the second correcting circuit is configured to output the third valid codeword.

11. The memory storage device of claim 10, wherein if the third valid codeword is not generated by the soft bit mode decoding procedure, the memory management circuit is configured to determine whether the number of read times is greater than a read threshold value,
if the number of read times is greater than the read threshold value, the memory management circuit is configured to determine that decoding fails,
if the number of read times is not greater than the read threshold value, the memory management circuit is configured to reset the first read voltage, and read the first memory cells according to the reset first read voltage to re-obtain the first verification bits again, and
the first correcting circuit is configured to perform the first hard bit mode decoding procedure according to the re-obtained first verification bits.

12. The memory storage device of claim 10, wherein the first verification bits are configured to generate a plurality of data bits, and the memory controlling circuit unit further comprises:
a checking circuit configured to perform a parity check procedure on the data bits to generate a plurality of syndromes; and
a memory coupled to the checking circuit, the first correcting circuit and the second correcting circuit, and configured to store the syndromes,
wherein the operation of the first correcting circuit performing the first hard bit mode decoding procedure according to the first verification bits comprises:
in an iterative decoding of a low density parity code, the first correcting circuit obtains a reliability message of each of the data bits according to the syndromes, and decides an index of an error bit from the data bits according to the reliability messages,
wherein the operation of the first correcting circuit determining whether the first bit mode decoding procedure generates the first valid codeword comprises:
the first correcting circuit determines whether the index of the error bit and the syndromes comply with a parity criteria; and
if the index of the error bit and the syndromes comply with the parity criteria, the first correcting circuit determines that the first valid codeword is generated by the first hard bit mode decoding procedure,
wherein the operation of the first correcting circuit outputting the first valid codeword comprises:
the first correcting circuit corrects the data bits according to the index of the error bits and outputs the corrected data bits.

13. The memory storage device of claim 12, wherein the memory management circuit is further configured to calculate a check sum according to the syndromes, and determine whether the check sum is less than a first check threshold value,
if the check sum is less than the first check threshold value, the first correcting circuit performs the first hard bit mode decoding procedure;
if the check sum is greater than or equal to the first check threshold value, the memory management circuit is further configured to determine whether the check sum is less than a second check threshold value,
if the check sum is less than the second check threshold value, the second correcting circuit performs the second hard bit mode decoding procedure,
if the check sum is greater than or equal to the second check threshold value, the memory management circuit is further configured to determine whether the check sum is less than a third check threshold value,
if the check sum is less than the third check threshold value, the second correcting circuit performs the soft bit mode decoding procedure.

14. The memory storage device of claim 9, wherein the memory management circuit is further configured to read a parity check matrix information from the rewritable non-volatile memory module,
the first correcting circuit is further configured to set a first parameter of the first correcting circuit according to the parity check matrix information, wherein the first hard bit mode decoding procedure is performed according to the first parameter,
the second correcting circuit is further configured to set a second parameter of the second correcting circuit according to the parity check matrix information, wherein the second hard bit mode decoding procedure is performed according to the second parameter.

15. The memory storage device of claim 14, wherein the memory controlling circuit unit further comprises a decoder, and the operation of the memory management circuit reading the parity check matrix information comprises:
the memory management circuit reads a first data from the rewritable non-volatile memory module; and
the decoder performs a BCH decoding procedure on the first data to obtain the parity check matrix information.

16. The memory storage device of claim 14, wherein the first hard bit mode decoding procedure and the second hard bit mode decoding procedure are corresponding to a Quasi-Cyclic Low-Density Parity-Check Code, the Quasi-Cyclic Low-Density Parity-Check Code comprising a parity check matrix, the parity check matrix comprising a plurality of permutation matrices, and the parity check matrix information comprising an index of each of the permutation matrices.

17. A memory controlling circuit unit, configured to control a rewritable non-volatile memory module, wherein the rewritable non-volatile memory module comprises a plurality of first memory cells, and the memory controlling circuit unit comprises:
a host interface configured to couple to a host system;
a memory interface configured to couple to the rewritable non-volatile memory module;

a memory management circuit coupled to the host interface and the memory interface, and configured to read the first memory cells according to a first read voltage to obtain a plurality of first verification bits;

an error checking and correcting circuit comprising a first correcting circuit and a second correcting circuit, wherein a precision of the first correcting circuit is less than a precision of the second correcting circuit, wherein the first correcting circuit is configured to perform a first hard bit mode decoding procedure according to the first verification bits, and determine whether the first hard bit mode decoding procedure generates a first valid codeword, wherein if the first valid codeword is generated by the first hard bit mode decoding procedure, the first correcting circuit is configured to output the first valid codeword, wherein if the first valid codeword is not generated by the first hard bit mode decoding procedure, the second correcting circuit is configured to perform a second hard bit mode decoding procedure according to the first verification bits, and determine whether the second hard bit mode decoding procedure generates a second valid codeword, wherein if the second valid codeword is generated by the second hard bit mode decoding procedure, the second correcting circuit is configured to output the second valid codeword.

18. The memory controlling circuit unit of claim 17, wherein if the second valid codeword is not generated by the second hard bit mode decoding procedure, the memory management circuit is configured to read the first memory cells according to a plurality of second read voltages to obtain a plurality of second verification bits, and the second correcting circuit is configured to perform a soft bit mode decoding procedure according to the second verification bits, wherein the number of the second read voltages is greater than the number of the first read voltage, the second correcting circuit is configured to determine whether the soft bit mode decoding procedure generates a third valid codeword, if the third valid codeword is generated by the soft bit mode decoding procedure, the second correcting circuit is configured to output the third valid codeword.

19. The memory controlling circuit unit of claim 18, wherein if the third valid codeword is not generated by the soft bit mode decoding procedure, the memory management circuit is configured to determine whether the number of read times is greater than a read threshold value, if the number of read times is greater than the read threshold value, the memory management circuit is configured to determine that decoding fails, if the number of read times is not greater than the read threshold value, the memory management circuit is configured to reset the first read voltage, and read the first memory cells according to the reset first read voltage to re-obtain the first verification bits again, and the first correcting circuit is configured to perform the first hard bit mode decoding procedure according to the re-obtained first verification bits.

20. The memory controlling circuit unit of claim 18, wherein the first verification bits are configured to generate a plurality of data bits, and the error checking and correcting circuit further comprises:

a checking circuit configured to perform a parity check procedure on the data bits to generate a plurality of syndromes; and a memory coupled to the checking circuit, the first correcting circuit and the second correcting circuit, and configured to store the syndromes, wherein the operation of the first correcting circuit performing the first hard bit mode decoding procedure according to the first verification bits comprises:

in an iterative decoding of a low density parity code, the first correcting circuit obtains a reliability message of each of the data bits according to the syndromes, and decides an index of an error bit from the data bits according to the reliability messages, wherein the operation of the first correcting circuit determining whether the first bit mode decoding procedure generates the first valid codeword comprises:

the first correcting circuit determines whether the index of the error bit and the syndromes comply with a parity criteria; and if the index of the error bit and the syndromes comply with the parity criteria, the first correcting circuit determines that the first valid codeword is generated by the first hard bit mode decoding procedure, wherein the operation of the first correcting circuit outputting the first valid codeword comprises:

the first correcting circuit corrects the data bits according to the index of the error bits and outputs the corrected data bits.

21. The memory controlling circuit unit of claim 20, wherein the memory management circuit is further configured to calculate a check sum according to the syndromes, and determine whether the check sum is less than a first check threshold value, if the check sum is less than the first check threshold value, the first correcting circuit performs the first hard bit mode decoding procedure;

if the check sum is greater than or equal to the first check threshold value, the memory management circuit is further configured to determine whether the check sum is less than a second check threshold value, if the check sum is less than the second check threshold value, the second correcting circuit performs the second hard bit mode decoding procedure, if the check sum is greater than or equal to the second check threshold value, the memory management circuit is further configured to determine whether the check sum is less than a third check threshold value, if the check sum is less than the third check threshold value, the second correcting circuit performs the soft bit mode decoding procedure.

22. The memory controlling circuit unit of claim 17, wherein the memory management circuit is further configured to read a parity check matrix information from the rewritable non-volatile memory module, the first correcting circuit is further configured to set a first parameter of the first correcting circuit according to the parity check matrix information, wherein the first hard bit mode decoding procedure is performed according to the first parameter, the second correcting circuit is further configured to set a second parameter of the second correcting circuit according to the parity check matrix information, wherein the second hard bit mode decoding procedure is performed according to the second parameter.

23. The memory controlling circuit unit of claim 22, wherein the memory controlling circuit unit further comprises a decoder, and the operation of the memory management circuit reading the parity check matrix information comprises:

the memory management circuit reads a first data from the rewritable non-volatile memory module; and the decoder performs a BCH decoding procedure on the first data to obtain the parity check matrix information.

24. The memory controlling circuit unit of claim 22, wherein the first hard bit mode decoding procedure and the second hard bit mode decoding procedure are corresponding to a Quasi-Cyclic Low-Density Parity-Check Code, the Quasi-Cyclic Low-Density Parity-Check Code comprising a parity check matrix, the parity check matrix comprising a plurality of permutation matrices, and the parity check matrix information comprising an index of each of the permutation matrices.

25. A decoding method for a rewritable non-volatile memory module, wherein the rewritable non-volatile memory module comprises a plurality of first memory cells, and the decoding method comprises:

transmitting a first read command sequence, wherein the first read command sequence is configured to read the first memory cells according to a first read voltage to obtain a plurality of first verification bits;

executing a parity check procedure according to the first verification bits to obtain a plurality of first syndromes;

determining a second read voltage according to the first syndromes, wherein the second read voltage is different from the first read voltage;

transmitting a second read command sequence, wherein the second read command sequence is configured to read the first memory cells according to the second read voltage to obtain a plurality of second verification bits; and executing a first decoding procedure according to the second verification bits.

26. The decoding method of the claim 25, wherein the step of determining the second read voltage according to the first syndromes comprises:

calculating a check sum according to the first verification bits;

updating a check sum information according to the check sum;

determining if the check sum information complies with a balance criteria; and increasing or decreasing the first read voltage according to whether the check sum information complies with the balance criteria to obtain the second read voltage.

27. The decoding method of the claim 26, wherein the check sum information is a check sum vector, and the step of updating the check sum information according to the check sum comprises:

adding the check sum into the check sum vector, wherein the step of determining if the check sum information complies with the balance criteria comprises:

obtaining a differential vector of the check sum vector;

calculating a sum of the differential vector; and determining if the sum of the differential vector is less than a balance threshold.

28. The decoding method of the claim 27, wherein the step of increasing or decreasing the first read voltage according to whether the check sum information complies with the balance criteria to obtain the second read voltage comprises:

if the sum of the differential vector is less than the balance threshold, increasing the first read voltage according to a read voltage table to obtain the second read voltage; and if the sum of the differential vector is greater than or equal to the balance threshold, decreasing the first read voltage according to the read voltage table to obtain the second read voltage.

29. The decoding method of the claim 25, wherein the first decoding procedure is a soft bit mode decoding procedure, and the step of executing the first decoding procedure according to the second verification bits comprises:

executing the parity check procedure according to the second verification bits to obtain a plurality of second syndromes;

re-deciding the second read voltage according to the second verifications;

transmitting a third read command sequence, wherein the third read command sequence is configured to instruct to read the first memory cells according to the re-decided second read voltage to re-obtain the second verification bits;

determining if a repeat reading criteria is satisfied;

if the repeat reading criteria is satisfied, re-executing the step of re-deciding the second read voltage; and the step of transmitting the third read command sequence until the repeat reading criteria is not satisfied; and if the repeat reading criteria is not satisfied, executing the soft bit mode decoding procedure according to the first verification bits, the second verifications, and the re-obtained second verification bits.

30. The decoding method of the claim 25, wherein the step of executing the soft bit mode decoding procedure according to the first verification bits, the second verifications, and the re-obtained second verification bits comprises:

adding the first verification bits, the second verification bits, and the re-obtained second verification bits to obtain a plurality of verification values;

obtaining a plurality of channel reality messages according to the verification values; and executing the soft bit mode decoding procedure according to the verification values.

31. The decoding method of the claim 29, wherein the step of determining if the repeat reading criteria is satisfied comprises:

determining if the number of read time is greater than a read threshold value;

if the number of read time is greater than the read threshold value, determining the repeat reading criteria is not satisfied; and if the number of read time is not greater than the read threshold value, determining the repeat reading criteria is satisfied.

32. The decoding method of claim 25, wherein before the step of determining the second read voltage according to the first verification bits, the decoding method comprises:

calculating a check sum according to the first syndromes;

determining whether the check sum is less than a first check threshold value;

if the check sum is less than the first check threshold value, performing a first hard bit mode decoding procedure by a first correcting circuit;

if the check sum is greater than or equal to the first check threshold value, determining whether the check sum is less than a second check threshold value; and if the check sum is less than the second check threshold value, performing a second hard bit mode decoding procedure by a second correcting circuit, wherein a precision of the first correcting circuit is less than a precision of the second correcting circuit.

33. The decoding method of the claim 32, further comprising:

if the check sum is greater than or equal to the second check threshold value, determining if the check sum is less than a third check threshold value;

if the check sum is less than third check threshold value, determining if a soft bit mode decoding procedure is supported;

if the soft bit mode decoding procedure is supported, executing the soft bit mode decoding procedure;

if the soft bit mode decoding procedure is not supported or the check sum is greater than or equal to the third check threshold value, determining the number of read time is greater than a read threshold value; and if the number of read time is not greater than the read threshold value, executing the step of determining the second read voltage according to the first verification bits.

34. A memory storage device, comprising:

a connection interface unit;

a rewritable non-volatile memory module; and a memory controlling circuit unit, coupled to the connection interface unit and the rewritable non-volatile memory module, and configured to determine if a soft bit mode decoding procedure is supported according to a identification code of the rewritable non-volatile memory module, if determining the soft bit mode decoding procedure is supported, the memory controlling circuit unit is configured to obtain a predetermined lookup table, and execute the soft bit mode decoding procedure according to the predetermined lookup table, if the soft bit mode decoding procedure is not supported, the memory controlling circuit unit is configured to establish a lookup table, and execute the soft bit mode decoding procedure according to the lookup table.

35. The memory storage device of the claim 34, wherein the operation of the memory controlling circuit unit establishing the lookup table comprises:

the memory controlling circuit unit transmits a first read command sequence, wherein the first read command sequence is configured to read a plurality of first memory cells in the rewritable non-volatile memory module according to a first read voltage to obtain a plurality of first verification bits;

the memory controlling circuit unit executes a parity check procedure according to the first verification bits to obtain a plurality of first syndromes, and decides a second read voltage according to the first syndromes, wherein the second read voltage is different from the first read voltage;

the memory controlling circuit unit transmits a second read command sequence, wherein the second read command sequence is configured to read the first memory cells according to the second read voltage to obtain a plurality of second verification bits; and the memory controlling circuit unit establishes the lookup table according to the first verification bits and the second verification bits.

36. The memory storage device of the claim 35, wherein the operating of the memory controlling circuit unit deciding the second read voltage according to the first syndromes comprises:

the memory controlling circuit unit calculates a check sum according to the first verification bits, updates a check sum information according to the check sum, and determines if the check sum information complies with a balance criteria; and the memory controlling circuit unit increases or decreases the first read voltage according to whether the check sum information complies with the balance criteria to obtain the second read voltage.

37. The memory storage device of the claim 36, wherein the check sum information is a check sum vector, and the operation of the memory controlling circuit unit updating the check sum information according to the check sum comprises:

the memory controlling circuit unit adds the check sum into the check sum vector, wherein the operation of the memory controlling circuit unit determining if the check sum information complies with the balance criteria comprises:

the memory controlling circuit unit obtains a differential vector of the check sum vector, calculates a sum of the differential vector, and determine if the sum of the differential vector is less than a balance threshold.

38. The memory storage device of the claim 37, wherein the step of the memory controlling circuit unit increasing or decreasing the first read voltage according to whether the check sum information complies with the balance criteria to obtain the second read voltage comprises:

if the sum of the differential vector is less than the balance threshold, the memory controlling circuit unit increases the first read voltage according to a read voltage table to obtain the second read voltage; and if the sum of the differential vector is greater than or equal to the balance threshold, the memory controlling circuit unit decreases the first read voltage according to the read voltage table to obtain the second read voltage.

39. The memory storage device of the claim 35, wherein the first decoding procedure is a soft bit mode decoding procedure, and the step of the memory controlling circuit unit executing the first decoding procedure according to the second verification bits comprises:

the memory controlling circuit unit executes the parity check procedure according to the second verification bits to obtain a plurality of second syndromes, re-decides the second read voltage according to the second verifications, and transmits a third read command sequence, wherein the third read command sequence is configured to instruct to read the first memory cells according to the re-decided second read voltage to re-obtain the second verification bits;

the memory controlling circuit unit determines if a repeat reading criteria is satisfied;

if the repeat reading criteria is satisfied, the memory controlling circuit unit re-executes the operation of re-deciding the second read voltage and the operation of transmitting the third read command sequence until the repeat reading criteria is not satisfied; and if the repeat reading criteria is not satisfied, the memory controlling circuit unit executes the soft bit mode decoding procedure according to the first verification bits, the second verifications, and the re-obtained second verification bits.

40. The memory storage device of the claim 39, wherein the step of the memory controlling circuit unit executing the soft bit mode decoding procedure according to the first verification bits, the second verifications, and the re-obtained second verification bits comprises:

the memory controlling circuit unit adds the first verification bits, the second verification bits, and the re-obtained second verification bits to obtain a plurality of verification values;

the memory controlling circuit unit establishes the lookup table according to the verification values, wherein the lookup table records a plurality of channel reliability messages.

41. The memory storage device of the claim 39, wherein the operation of the memory controlling circuit unit determining if the repeat reading criteria is satisfied comprises:
the memory controlling circuit unit determines the number of read time is greater than a read threshold;
if the number of read time is greater than the read threshold, the memory controlling circuit unit determines the repeat reading criteria is not satisfied; and
if the number of read time is not greater than the read threshold, the memory controlling circuit unit determines the repeat reading criteria is satisfied.

42. A memory storage device, comprising:
a connection interface unit;
a rewritable non-volatile memory module having a plurality of first memory cell; and
a memory controlling circuit unit coupled to the connection interface unit and the rewritable non-volatile memory module, wherein the memory controlling circuit unit is configured to issue a first read command sequence indicating to read the first memory cells according to a first read voltage to obtain a plurality of first verification bits,
wherein the memory controlling circuit unit is further configured to perform a parity check procedure according to the first verification bits to obtain a plurality of first syndromes and determine a second read voltage according to the first syndromes, wherein the second read voltage is different from the first read voltage,
wherein the memory controlling circuit unit is further configured to issue a second read command sequence indicating to read the first memory cells according to the second read voltage to obtain a plurality of second verification bits,
wherein the memory controlling circuit unit is further configured to perform a first decoding procedure according to the second verification bits.

43. The memory storage device of the claim 42, wherein in the operation of determining the second read voltage according to the first syndromes, the memory controlling circuit unit calculates a check sum according to the first syndromes, updates check sum information according to the syndrome sum, and determines whether the check sum information matches a balance condition,
wherein the memory controlling circuit unit increases or decreases the first read voltage to obtain the second read voltage based on a result of the determining whether the check sum information matches the balance condition.

44. The memory storage device of the claim 43, wherein the check sum information is a check sum vector,
wherein in the operation of updating the check sum information according to the syndrome sum, the memory controlling circuit unit adds the check sum into the check sum vector,
wherein in the operation of determining whether the check sum information matches the balance condition, the memory controlling circuit unit obtains a differential vector of the check sum vector, calculates a sum of the differential vector, and determining whether the sum of the differential vector is smaller than a balance threshold value.

45. A memory controlling circuit unit for controlling a rewritable non-volatile memory module including a plurality of first memory cells, and the memory controlling circuit unit comprising:
a host interface configured to couple to a host system;
a memory interface configured to couple to the rewritable non-volatile memory module;
a memory management circuit coupled to the host interface and the memory interface, wherein the memory management circuit is configured to issue a first read command sequence indicating to read the first memory cells according to a first read voltage to obtain a plurality of first verification bits,
an error checking and correcting circuit is configured to perform a parity check procedure according to the first verification bits to obtain a plurality of first syndromes,
wherein the memory management circuit is further configured to determine a second read voltage according to the first syndromes, wherein the second read voltage is different from the first read voltage,
wherein the memory management circuit is further configured to issue a second read command sequence indicating to read the first memory cells according to the second read voltage to obtain a plurality of second verification bits,
wherein the error checking and correcting circuit is further configured to perform a first decoding procedure according to the second verification bits.

46. The memory controlling circuit unit of the claim 45, wherein in the operation of determining the second read voltage according to the first syndromes, the memory management circuit calculates a check sum according to the first syndromes, updates check sum information according to the syndrome sum, and determines whether the check sum information matches a balance condition,
wherein the memory management circuit increases or decreases the first read voltage to obtain the second read voltage based on a result of the determining whether the check sum information matches the balance condition.

47. The memory storage device of the claim 46, wherein the check sum information is a check sum vector,
wherein in the operation of updating the check sum information according to the syndrome sum, the memory management circuit adds the check sum into the check sum vector,
wherein in the operation of determining whether the check sum information matches the balance condition, the memory management circuit obtains a differential vector of the check sum vector, calculates a sum of the differential vector, and determining whether the sum of the differential vector is smaller than a balance threshold value.

\* \* \* \* \*